(12) United States Patent
Murphy

(10) Patent No.: US 10,216,410 B2
(45) Date of Patent: *Feb. 26, 2019

(54) METHOD OF WORD IDENTIFICATION THAT USES INTERSPERSED TIME-INDEPENDENT SELECTION KEYS

(71) Applicant: Michael William Murphy, Bellingham, WA (US)

(72) Inventor: Michael William Murphy, Bellingham, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 15/139,862

(22) Filed: Apr. 27, 2016

(65) Prior Publication Data

US 2016/0320963 A1  Nov. 3, 2016

Related U.S. Application Data

(60) Provisional application No. 62/155,372, filed on Apr. 30, 2015.

(51) Int. Cl.
*G06F 3/02* (2006.01)
*G06F 17/24* (2006.01)
(Continued)

(52) U.S. Cl.
CPC ........ *G06F 3/04895* (2013.01); *G06F 3/0219* (2013.01); *G06F 3/0236* (2013.01);
(Continued)

(58) Field of Classification Search
CPC ........................... G06F 3/04886; G06F 3/0236
(Continued)

(56) References Cited

U.S. PATENT DOCUMENTS 4,481,508 A  11/1984  Kamei et al.
4,912,462 A * 3/1990  Washizuka ............ G06F 3/0236
                                                                341/22
(Continued)

FOREIGN PATENT DOCUMENTS

WO  01/49503 A1  7/2001
WO  2014/006639 A1  1/2014
WO  2014/062525 A1  4/2014

OTHER PUBLICATIONS

Extended European Search Report, dated Feb. 18, 2015, for corresponding European Application No. 11168711.7-1959/2395415, 7 pages.
(Continued)

*Primary Examiner* — Cao H Nguyen
(74) *Attorney, Agent, or Firm* — Seed IP Law Group LLP

(57) ABSTRACT

Systems, devices and methods are disclosed that improve error correction in time-dependent character input systems. Error correction algorithms correct inaccurately entered words by identifying alternative button press type combinations that conform to the number of button presses in a button press type sequence. The number of possible alternative combinations compounds as the number of button presses in a sequence increases. The disclosed improvement reduces the number of possible alternative button press type sequences by including interspersed time-independent selection buttons among the time-dependent ones. The algorithm divides the button press type sequence into segments at each time-independent button press type of the sequence. The algorithm identifies alternative button press type sequences separately for each segment, converts possible alternative button press type segments to character sequence segments, and considers the possible combinations of reconnected (Continued)

character sequence segments and time-independent character assignments as possible word alternatives.

9 Claims, 20 Drawing Sheets

(51) Int. Cl.
| | |
|---|---|
| *G06F 17/27* | (2006.01) |
| *G06F 9/451* | (2018.01) |
| *G06F 3/023* | (2006.01) |
| *G06F 3/0489* | (2013.01) |
| *G06F 3/0484* | (2013.01) |

(52) U.S. Cl.
CPC .......... *G06F 3/04847* (2013.01); *G06F 9/451* (2018.02); *G06F 17/24* (2013.01); *G06F 17/273* (2013.01)

(58) Field of Classification Search
USPC .................................................. 345/173, 156
See application file for complete search history.

(56) References Cited

U.S. PATENT DOCUMENTS

| | | | |
|---|---|---|---|
| 6,011,542 | A | 1/2000 | Durrani et al. |
| 6,271,835 | B1 | 8/2001 | Hoeksma |
| 6,278,384 | B1 | 8/2001 | Ide |
| 6,292,179 | B1 | 9/2001 | Lee |
| 6,295,052 | B1 | 9/2001 | Kato et al. |
| 6,597,345 | B2 | 7/2003 | Hirshberg |
| 6,799,303 | B2 | 9/2004 | Blumberg |
| 7,088,340 | B2 | 8/2006 | Kato |
| 7,218,249 | B2 | 5/2007 | Chadha |
| 7,256,769 | B2 | 8/2007 | Pun et al. |
| 7,382,358 | B2 | 7/2008 | Kushler et al. |
| 7,424,683 | B2 | 9/2008 | Van Leeuwen |
| 7,555,732 | B2 | 6/2009 | Van der Hoeven |
| 7,793,228 | B2 | 9/2010 | Mansfield et al. |
| 8,011,542 | B2 | 9/2011 | Gandy et al. |
| 8,316,319 | B1 | 11/2012 | Patel et al. |
| 8,416,217 | B1 | 4/2013 | Eriksson et al. |
| 8,487,877 | B2 | 7/2013 | Murphy |
| 8,896,543 | B2 | 11/2014 | Ettinger |
| 2002/0180622 | A1 | 12/2002 | Lui et al. |
| 2003/0095104 | A1 | 5/2003 | Kandogan et al. |
| 2003/0193478 | A1 | 10/2003 | Ng et al. |
| 2005/0043949 | A1 | 2/2005 | Roth et al. |
| 2005/0060138 | A1 | 3/2005 | Wang et al. |
| 2006/0019717 | A1 | 1/2006 | Gong |
| 2006/0066583 | A1 | 3/2006 | Toutonghi et al. |
| 2006/0016135 | A1 | 6/2006 | Ure |
| 2006/0119582 | A1 | 6/2006 | Ng et al. |
| 2006/0202865 | A1 | 9/2006 | Nguyen |
| 2006/0213754 | A1 | 9/2006 | Jarrett et al. |
| 2006/0290536 | A1 | 12/2006 | Tzeng |
| 2008/0291059 | A1 | 11/2008 | Longe |
| 2008/0316065 | A1 | 12/2008 | Maber |
| 2009/0201252 | A1 | 8/2009 | Lee |
| 2010/0120469 | A1 | 5/2010 | Mousseau et al. |
| 2010/0257478 | A1 | 10/2010 | Longe et al. |
| 2010/0271241 | A1 | 10/2010 | Weller et al. |
| 2010/0333011 | A1 | 12/2010 | Kornev et al. |
| 2011/0032200 | A1 | 2/2011 | Park et al. |
| 2011/0163973 | A1 | 7/2011 | Ording et al. |
| 2011/0304483 | A1 | 12/2011 | Moon |
| 2012/0062465 | A1 | 3/2012 | Spetalnick |
| 2012/0102401 | A1 | 4/2012 | Ijas et al. |
| 2012/0306747 | A1 | 12/2012 | Davidson et al. |
| 2012/0306754 | A1 | 12/2012 | Jeong |
| 2013/0021258 | A1 | 1/2013 | Salman et al. |
| 2013/0046544 | A1 | 2/2013 | Kay et al. |
| 2013/0120274 | A1 | 5/2013 | Ha et al. |
| 2013/0187831 | A1 | 7/2013 | Sirpal et al. |
| 2013/0194191 | A1 | 8/2013 | Bradford et al. |
| 2013/0278506 | A1 | 10/2013 | Murphy |
| 2014/0049477 | A1* | 2/2014 | Dai .................. G06F 3/04886 345/173 |
| 2014/0173522 | A1 | 6/2014 | Murphy |

OTHER PUBLICATIONS

International Search Report and Written Opinion, dated May 11, 2016, for corresponding International Application No. PCT/US2015/058654, 11 pages.

Murphy, "Novel Character Specification System and Method That Uses a Limited Number of Selection Keys," U.S. Appl. No. 14/511,064, filed Oct. 9, 2014, 70 pages.

Murphy, "Improved Method of Word Identification That Uses an Array Variable," U.S. Appl. No. 15/139,872, filed Apr. 27, 2016, 62 pages.

Murphy, "Method and System of Multi-Variable Character Input," U.S. Appl. No. 15/139,866, filed Apr. 27, 2016, 84 pages.

Murphy, "Systems and Methods for Word Identification That Use Button Press Type Error Analysis," U.S. Appl. No. 15/139,858, filed Apr. 27, 2016, 90 pages.

Murphy, "Systems, Methods and Devices for Input of Characters With Optional Time-Based Button Taps," U.S. Appl. No. 14/627,822, filed Feb. 20, 2015, 38 pages.

International Search Report and Written Opinion, dated Aug. 8, 2016, for corresponding International Application No. PCT/US2016/029611, 10 pages.

International Search Report and Written Opinion, dated Aug. 10, 2016, for corresponding International Application No. PCT/US2016/029614, 11 pages.

Murphy, "Method of Character Identification That Uses Button Press Types," U.S. Appl. No. 14/701,417, filed Apr. 30, 2015, 56 pages.

* cited by examiner

FIG. 9

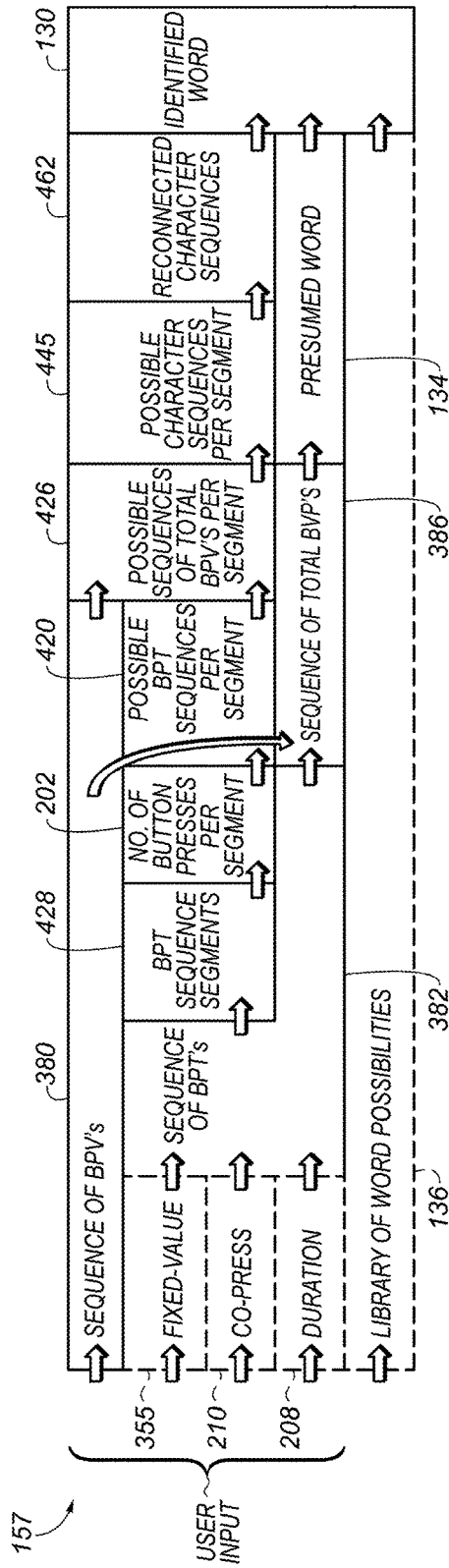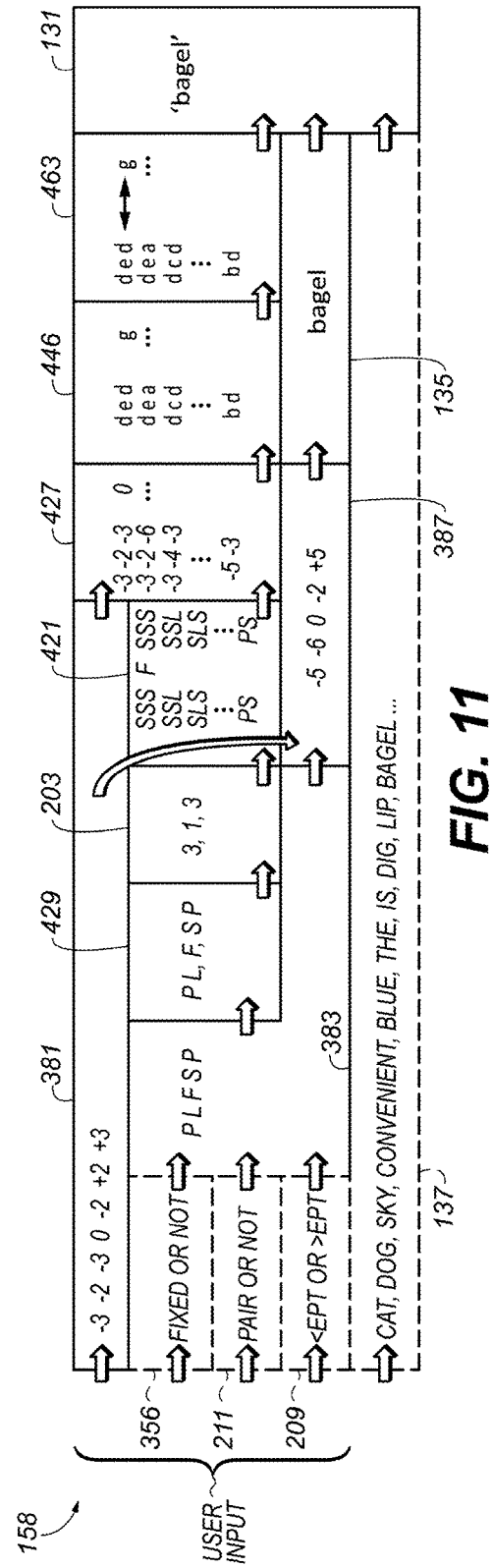
FIG. 11

| INPUT METHOD | INPUT VARIABLES | POSSIBLE VALUES | LEVEL OF CONTROL | FACTOR DETERMINING LEVEL OF CONTROL |
|---|---|---|---|---|
| 708 → REDUCED BUTTON INPUT | 1. BUTTON PRESS VALUE ~222<br>2. CO-PRESS ~210<br>3. DURATION ~208<br>4. FIXED-VALUE ~355 | -3, -2, 0, +2, OR +3<br>PAIR OR NOT<br><ETP OR >ETP<br>FIXED-VALUE OR NOT | HIGH<br>LOW<br>LOW<br>HIGH | BUTTON SIZE<br>MOMENT OF BUTTON PRESS<br>MOMENT OF BUTTON RELEASE<br>BUTTON SIZE |
| 132 → 26-BUTTON | BUTTON PRESS VALUE<br>222 | a, b, c, d, e ... | LOW | BUTTON SIZE |

*FIG. 13*

METHOD OF WORD IDENTIFICATION THAT USES INTERSPERSED TIME-INDEPENDENT SELECTION KEYS

TECHNICAL FIELD

This description generally relates to the field of electronic devices and, more particularly, to user interfaces of electronic devices.

BRIEF SUMMARY

A computer processor-implemented method may be summarized as including: receiving, by at least one computer processor, input resulting from actuation of a plurality of time-dependent buttons and at least one time-independent button; interpreting, by at least one computer processor, from the received input, a sequence of button press values and a sequence of button press types; dividing, by at least one computer processor, the interpreted sequence of button press types into segments at positions in the sequence occupied by a button press type that is interpreted from an actuation of the at least one time-independent button; determining, by at least one computer processor, for each segment, at least one alternative sequence of button press types associated with the segment, wherein each alternative sequence of button press types associated with the segment has a same number of button actuations as the segment; converting, by at least one computer processor, for each segment, each associated alternative sequence of button press types to an alternative sequence of characters associated with the segment according to the interpreted sequence of button press values; and determining, by at least one computer processor, at least one reconnected sequence comprised of, for each segment, an alternative sequence of characters associated with the segment or a presumed sequence of characters associated with the segment, the presumed sequence of characters associated with the segment based on the input resulting from the actuation of the buttons.

The at least one reconnected sequence may be a plurality of alternative reconnected sequences and may further include: comparing, by at least one computer processor, the plurality of reconnected sequences with a library of known words; and selecting, by at least one computer processor, one of the plurality of reconnected sequences as input in place of a presumed word, the presumed word based on the input resulting from the actuations of the buttons. The at least one reconnected sequence may be comprised of, for each segment, an alternative sequence of characters associated with the segment.

A system may be summarized as including: at least one computer processor; and at least one memory coupled to the at least one computer processor, the at least one memory having computer executable instructions stored thereon that, when executed, cause the at least one processor to perform: receiving input resulting from actuation of a plurality of time-dependent buttons and at least one time-independent button; interpreting from the received input, a sequence of button press values and a sequence of button press types; dividing the interpreted sequence of button press types into segments at positions in the sequence occupied by a button press type that is interpreted from an actuation of the at least one time-independent button; determining, for each segment, at least one alternative sequence of button press types associated with the segment, wherein each alternative sequence of button press types associated with the segment has a same number of button actuations as the segment; converting for each segment, each associated alternative sequence of button press types to an alternative sequence of characters associated with the segment according to the interpreted sequence of button press values; and determining at least one reconnected sequence comprised of, for each segment, an alternative sequence of characters associated with the segment or a presumed sequence of characters associated with the segment, the presumed sequence of characters associated with the segment based on the input resulting from the actuation of the buttons.

The at least one reconnected sequence may be a plurality of alternative reconnected sequences and wherein the computer executable instructions, when executed, may further cause the at least one processor to perform: comparing the plurality of reconnected sequences with a library of known words; and selecting one of the plurality of reconnected sequences as input in place of a presumed word, the presumed word based on the input resulting from the actuations of the buttons. The at least one reconnected sequence may be comprised of, for each segment, an alternative sequence of characters associated with the segment.

A non-transitory computer-readable medium may be summarized as having computer executable instructions stored thereon that, when executed, cause at least one processor to perform: receiving input resulting from actuation of a plurality of time-dependent buttons and at least one time-independent button; interpreting from the received input, a sequence of button press values and a sequence of button press types; dividing the interpreted sequence of button press types into segments at positions in the sequence occupied by a button press type that is interpreted from an actuation of the at least one time-independent button; determining, for each segment, at least one alternative sequence of button press types associated with the segment, wherein each alternative sequence of button press types associated with the segment has a same number of button actuations as the segment; converting for each segment, each associated alternative sequence of button press types to an alternative sequence of characters associated with the segment according to the interpreted sequence of button press values; and determining at least one reconnected sequence comprised of, for each segment, an alternative sequence of characters associated with the segment or a presumed sequence of characters associated with the segment, the presumed sequence of characters associated with the segment based on the input resulting from the actuation of the buttons.

The at least one reconnected sequence may be a plurality of alternative reconnected sequences and wherein the computer executable instructions, when executed, may further cause the at least one processor to perform: comparing the plurality of reconnected sequences with a library of known words; and selecting one of the plurality of reconnected sequences as input in place of a presumed word, the presumed word based on the input resulting from the actuations of the buttons. The at least one reconnected sequence may be comprised of, for each segment, an alternative sequence of characters associated with the segment.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIGS. 6-9 are examples of an application of a method of word identification.

FIG. 11 is a flow diagram of variables and example values of another method to interpret button presses according to one illustrated embodiment.

FIG. 13 is a table of characteristics of two different methods to input characters.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Various embodiments are described herein that provide systems, devices and methods for input of characters with optional time-dependent button presses.

Figure 1:
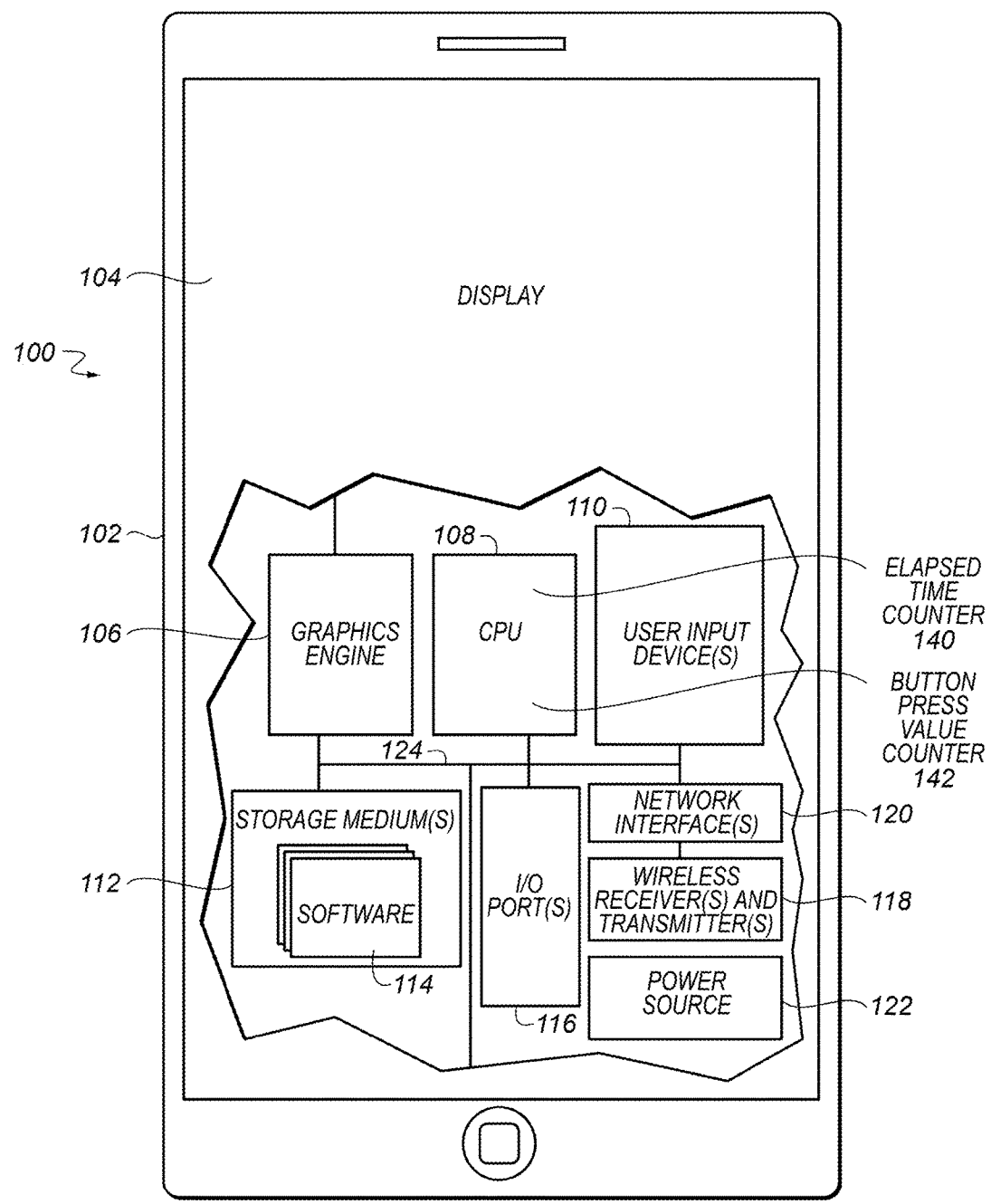
FIG. 1 is a schematic view of an example electronic device for input of characters with optional time-dependent button presses according to one illustrated embodiment, the electronic device being a mobile device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), a power source, an elapsed time counter and a button press value counter.

For example, FIG. 1 is a schematic view of one example electronic device, in this case mobile device 100, for input of characters with optional time-dependent button presses according to one illustrated embodiment. The mobile device 100 shown in FIG. 1 may have a housing 102, a display 104, a graphics engine 106, a central processing unit (CPU) 108, one or more user input devices 110, one or more storage mediums 112 having various software modules 114 stored thereon comprising instructions that are executable by the CPU 108, input/output (I/O) port(s) 116, one or more wireless receivers and transmitters 118, one or more network interfaces 120, and a power source 122. In some embodiments, some or all of the same, similar or equivalent structure and functionality of the mobile device 100 shown in FIG. 1 and described herein may be that of, part of or operably connected to a communication and/or computing system of another device or machine.

The mobile device 100 may be any of a large variety of communications devices such as a cellular telephone, a smartphone, a wearable device, a wristwatch, a portable media player (PMP), a personal digital assistant (PDA), a mobile communications device, a portable computer with built-in or add-on cellular communications, a portable game console, a global positioning system (GPS), a handheld industrial electronic device, or the like, or any combination thereof. The mobile device 100 has at least one central processing unit (CPU) 108 which may be a scalar processor, a digital signal processor (DSP), a reduced instruction set (RISC) processor, or any other suitable processor. The central processing unit (CPU) 108, display 104, graphics engine 106, one or more user input devices 110, one or more storage mediums 112, input/output (I/O) port(s) 116, one or more wireless receivers and transmitters 118, and one or more network interfaces 120 may all be communicatively connected to each other via a system bus 124. The system bus 124 can employ any suitable bus structures or architectures, including a memory bus with memory controller, a peripheral bus, and/or a local bus.

The mobile device 100 also includes one or more volatile and/or non-volatile storage medium(s) 112. The storage mediums 112 may be comprised of any single or suitable combination of various types of processor-readable storage media and may store instructions and data acted on by CPU 108. For example, a particular collection of software instructions comprising software 114 and/or firmware instructions comprising firmware are executed by CPU 108. The software or firmware instructions generally control many of the operations of the mobile device 100 and a subset of the software and/or firmware instructions may perform functions to operatively configure hardware and other software in the mobile device 100 to provide the initiation, control and maintenance of applicable computer network and telecommunication links from the mobile device 100 to other devices using the wireless receiver(s) and transmitter(s) 118, network interface(s) 120, and/or I/O ports 116.

The CPU 108 includes an elapsed time counter 140. The elapsed time counter 140 may be implemented using a timer circuit operably connected to or as part of the CPU 108. Alternately some or all of the elapsed time counter 140 may be implemented in computer software as computer executable instructions stored on volatile and/or non-volatile storage medium(s) 112, for example, that when executed by CPU 108 or a processor of a timer circuit, performs the functions described herein of the elapsed time counter 140.

The CPU 108 includes a button press value counter 142. Alternately, some or all of the button press value counter 142 may be implemented in computer software as computer executable instructions stored on volatile and/or non-volatile storage medium(s) 112, for example, that when executed by CPU 108, performs the functions described herein of the button press value counter 142.

By way of example, and not limitation, the storage medium(s) 112 may be processor-readable storage media which may comprise any combination of computer storage media including volatile and nonvolatile, removable and non-removable media implemented in any method or technology for storage of information such as computer readable instructions, data structures, program modules or other data. Combinations of any of the above should also be included within the scope of processor-readable storage media.

The storage medium(s) 112 may include system memory which includes computer storage media in the form of volatile and/or nonvolatile memory such as read-only memory (ROM) and random access memory (RAM). A basic input/output system (BIOS), containing the basic routines that help to transfer information between elements within mobile device 100, such as during start-up or power-on, is typically stored in ROM. RAM typically contains data and/or program modules that are immediately accessible to and/or presently being operated on by CPU 108. By way of example, and not limitation, FIG. 1 illustrates software modules 114 including an operating system, application programs and other program modules that implement the processes and methods described herein.

The mobile device 100 may also include other removable/non-removable, volatile/nonvolatile computer storage media drives. By way of example only, the storage medium(s) 112 may include a hard disk drive or solid state storage drive that reads from or writes to non-removable, nonvolatile media, a SSD that reads from or writes to a removable, nonvolatile SSD, and/or an optical disk drive that reads from or writes to a removable, nonvolatile optical disk such as a DVD-RW or other optical media. Other removable/non-removable, volatile/nonvolatile computer storage media that can be used in an operating environment of the mobile device 100 include, but are not limited to, flash memory cards, other types of digital versatile disks (DVDs), micro-discs, digital video tape, solid state RAM, solid state ROM, and the like. The storage medium(s) are typically connected to the system bus 124 through a non-removable memory interface. The storage medium(s) 112 discussed above and illustrated in FIG. 1 provide storage of computer readable instructions, data structures, program modules and other data for the mobile device 100. In FIG. 1, for example, a storage medium may store software 114 including an operating system, application programs, other program modules, and program data. The storage medium(s) 112 may implement a file system, a flat memory architecture, a database, or any other method or combination capable for storing such information.

A user may enter commands and information into the mobile device 100 through touch screen display 104 or the one or more other input device(s) 110 such as a keypad, keyboard, tactile buttons, camera, motion sensor, position sensor, light sensor, biometric data sensor, accelerometer, or a pointing device, commonly referred to as a mouse, trackball or touch pad. Other input devices of the mobile device 100 may include a microphone, joystick, thumbstick, game pad, optical scanner, other sensors, or the like. These and other input devices are often connected to the CPU 108 through a user input interface that is coupled to the system bus 124, but may be connected by other interface and bus structures, such as a parallel port, serial port, wireless port, game port or a universal serial bus (USB). Generally, a unique software driver stored in software 114 configures each input mechanism to sense user input, and then the software driver provides data points that are acted on by CPU 108 under the direction of other software 114. The display is also connected to the system bus 124 via an interface, such as the graphics engine 106. In addition to the display 104, the mobile device 100 may also include other peripheral output devices such as speakers, a printer, a projector, an external monitor, etc., which may be connected through one or more analog or digital I/O ports 116, network interface(s) 120 or wireless receiver(s) and transmitter(s) 118. The mobile device 100 may operate in a networked environment using connections to one or more remote computers or devices, such as a remote computer or device.

When used in a LAN or WAN networking environment, the mobile device 100 may be connected via the wireless receiver(s) and transmitter(s) 118 and network interface(s) 120, which may include, for example, cellular receiver(s) and transmitter(s), Wi-Fi receiver(s) and transmitter(s), and associated network interface(s). When used in a WAN networking environment, the mobile device 100 may include a modem or other means as part of the network interface(s) for establishing communications over the WAN, such as the Internet. The wireless receiver(s) and transmitter(s) 118 and the network interface(s) 120 may be communicatively connected to the system bus 124. In a networked environment, program modules depicted relative to the mobile device 100, or portions thereof, may be stored in a remote memory storage device of a remote system.

The mobile device 100 has a collection of I/O ports 116 and/or short range wireless receiver(s) and transmitter(s) 118 and network interface(s) 120 for passing data over short distances to and from the mobile device 100 or for coupling additional storage to the mobile device 100. For example, serial ports, USB ports, Wi-Fi ports, Bluetooth® ports, IEEE 1394 (i.e., FireWire), and the like can communicatively couple the mobile device 100 to other computing apparatuses. Compact Flash (CF) ports, Secure Digital (SD) ports, and the like can couple a memory device to the mobile device 100 for reading and writing by the CPU 108 or couple the mobile device 100 to other communications interfaces such as Wi-Fi or Bluetooth transmitters/receivers and/or network interfaces.

Mobile device 100 also has a power source 122 (e.g., a battery). The power source 122 may supply energy for all the components of the mobile device 100 that require power when a traditional, wired or wireless power source is unavailable or otherwise not connected. Other various suitable system architectures and designs of the mobile device 100 are contemplated and may be utilized which provide the same, similar or equivalent functionality as those described herein.

It should be understood that the various techniques, components and modules described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as various solid state memory devices, DVD-RW, RAM, hard drives, flash drives, or any other machine-readable or processor-readable storage medium wherein, when the program code is loaded into and executed by a machine, such as a processor of a computer, vehicle or mobile device, the machine becomes an apparatus for practicing various embodiments. In the case of program code execution on programmable computers, vehicles or mobile devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system of mobile device 100. However, the program(s) can be implemented in assembly or machine language, if desired. In any case, the language may be a compiled or interpreted language, and combined with hardware implementations.

Figure 2:
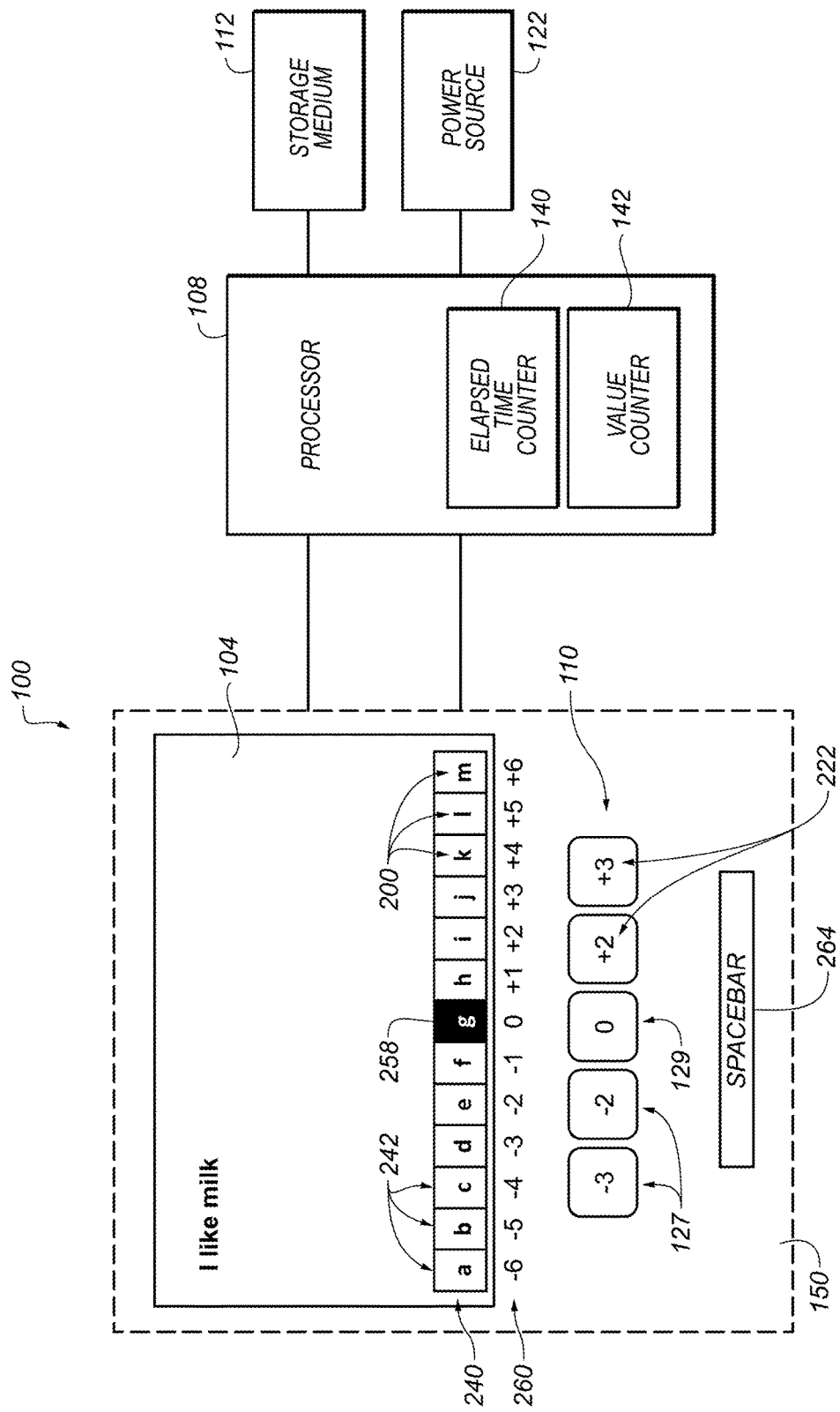
FIG. 2 is a schematic drawing of one embodiment of the electronic device 100 for input of characters. Aspects of the user interface 150 were previously disclosed in FIG. 8 of U.S. Pat. No. 8,487,877, which is hereby incorporated by reference in its entirety.

FIG. 2 shows a schematic drawing of one embodiment of the electronic device 100 for input of characters. The device 100 may have some or all the components and functionality described herein with respect to the mobile device 100 of FIG. 1. The device 100 has aspects previously disclosed in FIG. 8 of U.S. Pat. No. 8,487,877, which is hereby incorporated by reference in its entirety.

The electronic device 100 includes the display 104, a plurality of characters 200 that populate positions 242 of a character menu 240, a plurality of selection buttons 110 including both time-dependent selection buttons 127 and at least one time-independent selection button 129, and a spacebar button 264, which together make up a user interface 150 of the device 100. Each of the plurality of selection buttons 110 has an assigned button press value 222. Included as part or within proximity to the menu 240 is a reference 258 and an offset scale 260. The display 104, the plurality of selection buttons 110, and the spacebar button 264 are communicatively coupled with the CPU 108, as described in the embodiment of FIG. 1. The CPU 108 includes the elapsed time counter 140 and the button press value counter 142, as described in the embodiment of FIG. 1. The CPU 108 is communicatively coupled with the storage medium 112 and the power source 122, as described in the embodiment of FIG. 1.

Figure 8:
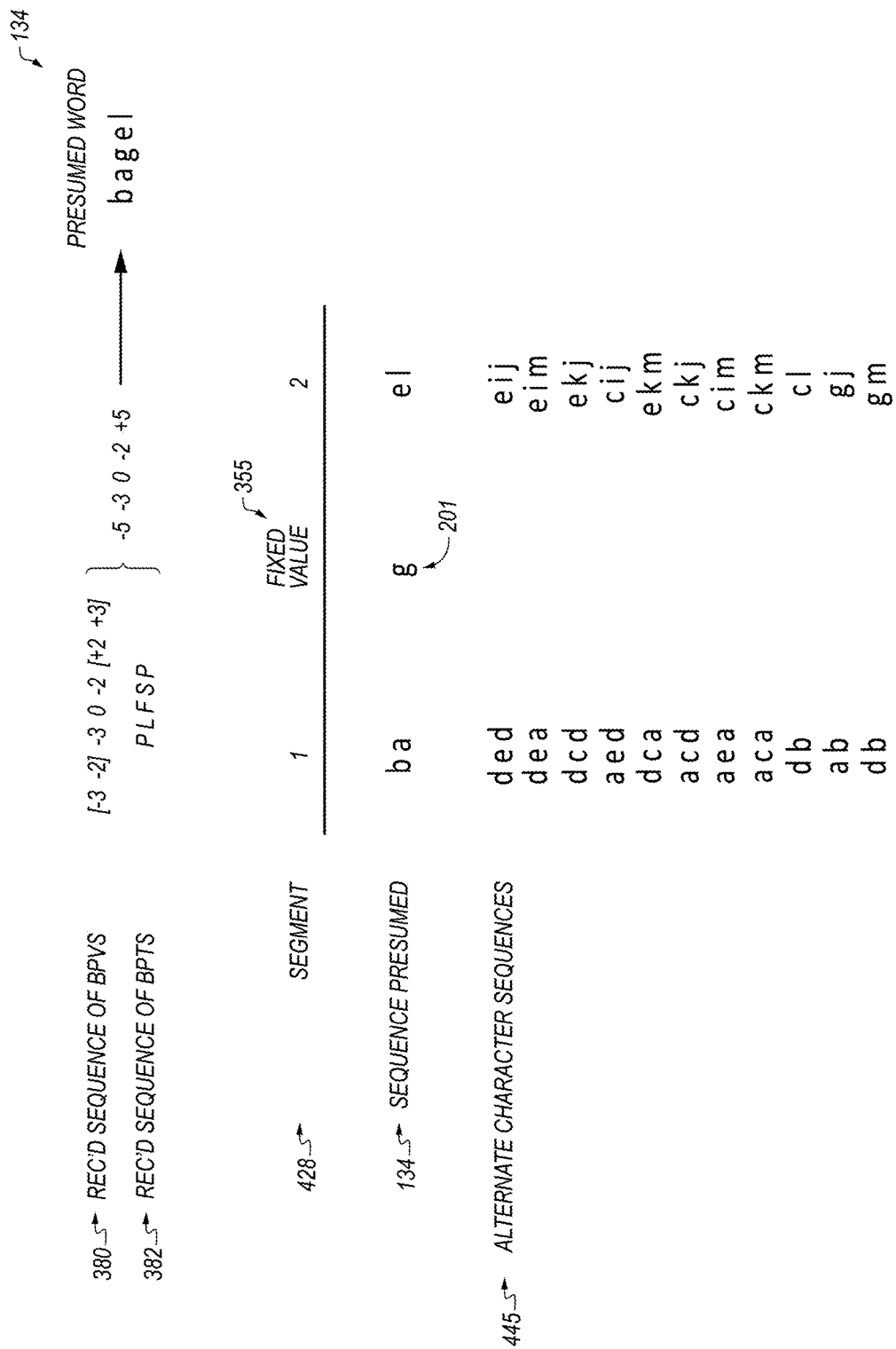

In the embodiment of FIG. 2, the positions 242 of the menu 240 are arranged in a one-dimensional array similar to the embodiment in FIG. 8 of U.S. Pat. No. 8,487,877, with the exception that the menu 240 is shown on the display 104 instead of as a physical feature of the user interface 150. The plurality of selection buttons 110 can be either hard keys (physical buttons) or soft keys (buttons shown on the display 104). In the embodiment of FIG. 2, the selection buttons 110 are shown as physical buttons. In either case, the buttons 110 are communicatively coupled with the CPU 108. The selection buttons 110 can be arranged in any pattern. In one embodiment, the time-dependent buttons 127 and time-independent buttons 129 are interspersed amongst one another on the user interface 150. In another embodiment, the buttons 127, 129 are interspersed amongst one another in an arrangement on the display 104.

The menu 240 and the offset scale 260 are positioned in respective one-dimensional arrays on the user interface 150 of the device 100. In one embodiment the character menu 240 and the offset scale 260 are positioned on the user interface 150 so that they lie adjacent to and parallel with one other. In one embodiment, the character menu 240 and the offset scale 260 are programmed in software so that they appear as features on the display 104 of the device 100.

In one embodiment, positions 242 of the menu 240 are distributed in a one-dimensional array in evenly spaced increments. In a further embodiment, values of the offset scale 260 are distributed in a one-dimensional array in spatial increments that match the increment of the menu 240, so that by referencing the offset scale 260 to the menu 240, characters 200 in the menu are effectively numbered.

The reference 258 is an indicator located near or on one of the positions 242 of the menu 240. The offset scale 260 includes a value of zero that is located to correspond with the reference 258 of the menu 240. Values of the offset scale 260 increase from zero in pre-selected increments as positions of the offset scale get farther from the zero value. In a further embodiment, values of the offset scale 260 decrease from zero in pre-selected increments as positions of the offset scale get farther from the zero value in a direction opposite to the increasing direction. In one embodiment, the pre-selected increment of the offset scale 260 equals one and the values of the offset scale extend from a negative value to a positive value passing through zero. In an alternative embodiment, the increment of the offset scale 260 is 10 and positions 242 of the menu 240 are marked off in corresponding units of 10.

In one specific embodiment, the positions 242 of the menu 240 and the values of the offset scale 260 are distributed in respective one-dimensional arrays positioned adjacent to and parallel with one another, the values of the offset scale 260 count in increments of one and are spaced with respect to one another in their array to correspond with the spacing of positions 242 of the menu 240, and the zero value of the offset scale 260 corresponds to the reference 258 of the menu 240 so that the values of the offset scale 260 label the positions of the menu 240 according to how many positions a given position 242 of the menu 240 is offset from the reference 258.

The plurality of selection buttons 110 lie on the user interface 150 of the device 100 and, as described above, can be either hard or soft keys. In one embodiment, the buttons 110 are arranged in a row that corresponds to the physical alignment of the menu 240 on the user interface. Each button is communicatively coupled with the CPU 108 and is assigned a button press value 222. The assigned button press value 222 can be either positive or negative. Each button 110 has the function that when the button is pressed the value 222 assigned to the button is input to the CPU 108. In one embodiment, the assigned button press value 222 of each selection button is unique. In another embodiment there are five selection buttons, some buttons are time-dependent 127 while others are time-independent 129, and the buttons' assigned values are −3, −2, 0, +2, and +3. In still another embodiment there are six selection buttons, some buttons are time-dependent 127 while others are time-independent 129, and the buttons' assigned values are −3, −2, −1, +1, +2, and +3.

The space bar also lies on the user interface 150 of the device 100, can be either a hard or soft key, and is communicatively coupled with the CPU 108.

Figure 3:
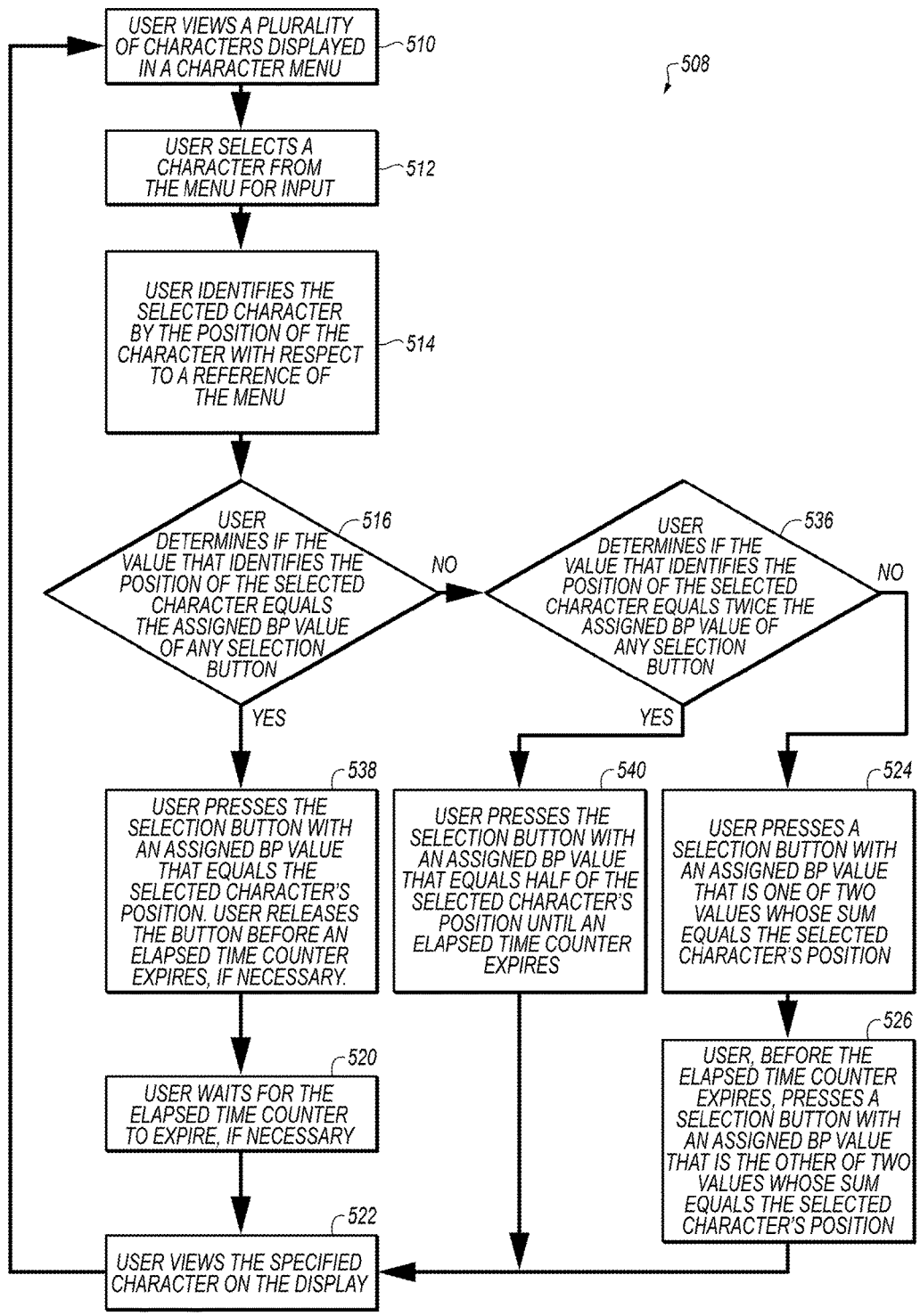
FIG. 3 is a flow diagram of a method for specifying a character from among a plurality of characters according to one illustrated embodiment.

FIGS. 3 and 4 show flowcharts for, respectively, an embodiment of a method 508 for specifying a character from among a plurality of characters and an embodiment of a method 608 for an electronic device to interpret button presses—both in accordance with the user interface 150 of FIG. 2.

In FIG. 3, in one step 510 of the method 508, a user views the plurality of characters 200 displayed in the menu 240. In another step 512, the user selects a character from the menu 240 for input to the electronic device 100.

In another step 514, the user identifies the selected character by the position 242 of the character with respect to the reference 258, for example by a value equal to the number of positions 242 the selected character is offset from the menu's reference 258. The user can identify the position 242 of the selected character in its row 244 in a number of ways, including by referencing the position to a corresponding value in the offset scale 260, counting the number of positions 242 that the selected character is offset from the reference 258, recalling from memory the value that identifies the particular selected character, and recalling by muscle memory the selection button keystrokes that correspond with the selected character or the selected character's position.

In another step 516, the user determines whether the value that identifies the selected character's position 242 in the menu 240 equals the assigned value 222 of any of the selection buttons 110. If one of the selection buttons 110 has an assigned value 222 that is equal, in another step 538 the user presses the selection button with the assigned value that equals the selected character's position and releases the button before the elapsed time counter expires. If the pressed selection button is one of the time-independent (also called fixed-value) selection keys 129, then the condition that the user must release the button before the elapsed time counter expires is removed. The aforementioned step 538 inputs the assigned value 222 of the pressed selection button to the CPU 108.

If the pressed selection button is one of the time-dependent selection keys 127, the step 538 also triggers the CPU 108 to start the elapsed time counter 140 and indicates to the CPU 108 that the type of button press is a SHORT press 340. If the pressed selection button is one of the time-independent selection keys 129, the step 538 indicates to the CPU that the type of button press is a FIXED press 355.

In a subsequent step 520, if the pressed selection button is one of the time-dependent selection keys 127 the user waits for the elapsed time counter 140 to expire. If the pressed selection button is one of the time-independent selection keys 129, step 520 is bypassed. In an optional step 522, the user views the specified character on the display 104. In an alternative embodiment, step 522 is bypassed.

However, if the value that identifies the selected character's position 242 in the menu 240 is not equal to the assigned value of any selection button, then in an alternate step 536, the user determines whether the value that identifies the selected character's position 242 in its menu row 244 equals twice the assigned button press value 222 of any selection button 110.

If so, in another step 540 the user presses the selection button 110 with the assigned value 222 that equals half the selected character's position and maintains the button press until the elapsed time counter expires. The aforementioned step 540 inputs the assigned value 222 of the pressed selection button to the CPU 108, triggers the CPU 108 to start the elapsed time counter 140, and indicates to the processor that the type of button press is a LONG press 345. In an optional step 522, the user views the specified character on the display 104. In an alternative embodiment, step 522 is bypassed.

However, if none of the values 222 assigned to the selection buttons 110 equals the selected character's position 242 or is half the selected character's position, in an alternate step 524 the user presses the selection button with the assigned value 222 that is one of two values whose sum equals the selected character's position. The aforementioned step 524 inputs the assigned value 222 of the pressed selection button 110 to the CPU 108 and triggers the CPU to start the elapsed time counter 140. In a subsequent step 526, the user presses the selection button 110 with the assigned value 222 that is the other of two values whose sum equals the selected character's position 242 and does so before the elapsed time counter 140 expires. The aforementioned step 526 inputs the assigned value 222 of the pressed selection button 110 to the CPU 108 and indicates to the processor that the type of button press is PAIR 350. Optionally, as part of the step 526, the CPU 108 may also terminate the elapsed time counter 140. Once the user has pressed the second selection button, in another step 522 the user views the specified character on the display 104, which is an optional step and in an alternative embodiment is bypassed.

According to another embodiment of the invention, the character specification method 508 described above is used iteratively to specify series of characters from the character menu 240. In one embodiment, words and sentences are formed on the display 104 by iteratively specifying characters according the method above, with the spacebar 264 used to input spaces between words on the display.

Figure 4A:
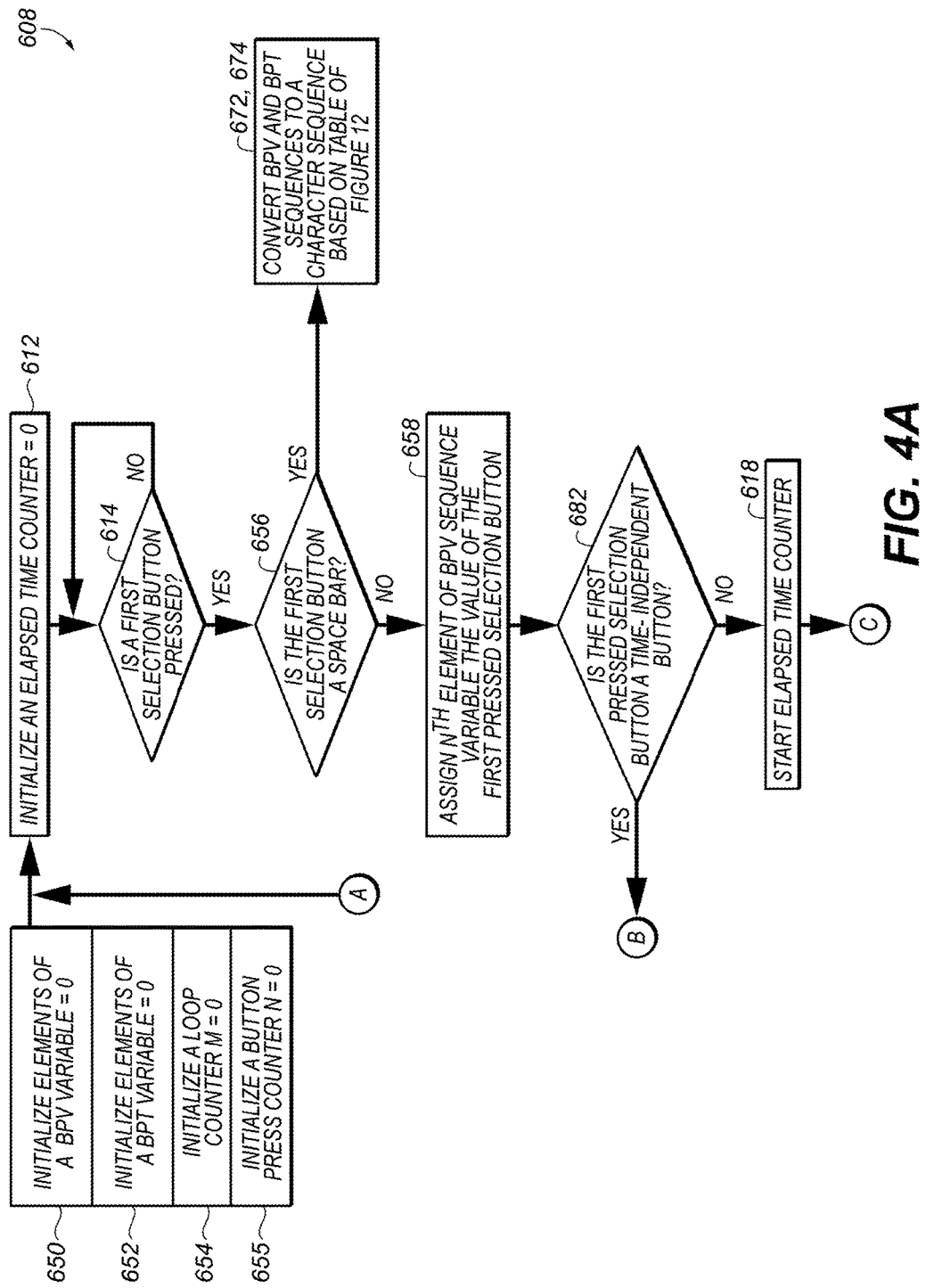
FIGS. 4A and 4B are flow diagrams of a method for an electronic device to interpret button presses according to one illustrated embodiment.
Figure 4B:
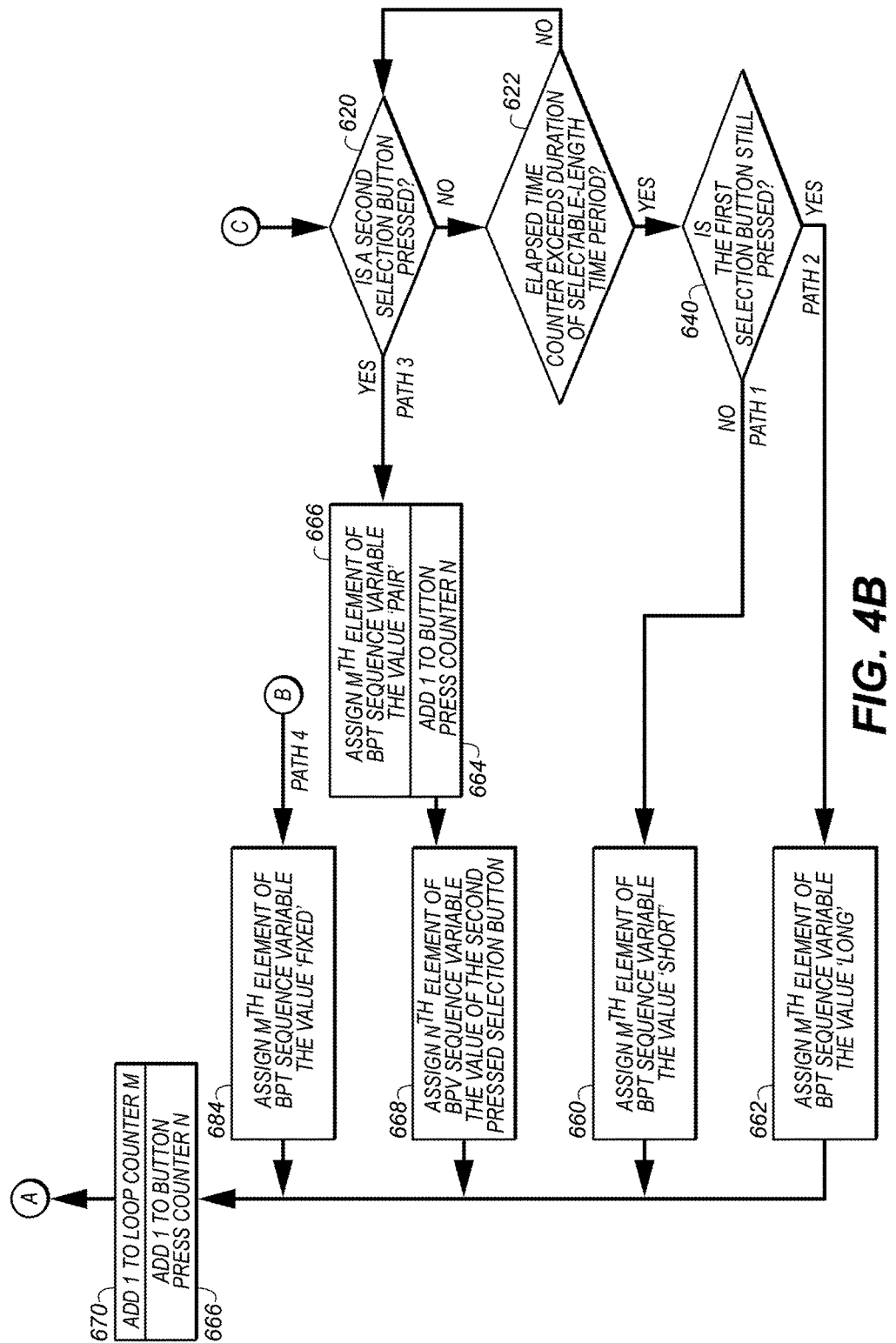

FIGS. 4A and 4B show flowcharts of an embodiment of a method 608 for the processor 108 of an electronic device to interpret sequences of button presses.

In one step 650 of the method 608, the CPU 108 initializes elements of an array variable 'sequence of button press values' 380 to zero. In another step 652 the CPU 108 initializes elements of an array variable 'sequence of button press types' 382 to zero. In another step 654 the CPU 108 initializes a variable 'number of loops m' 390 to zero. In another step 655 the CPU 108 initializes a variable 'number of button presses n' 392 to zero.

In another step 612 the CPU 108 initializes the elapsed time counter 140 to zero. In another step 614, the CPU 108 monitors the selection buttons 110 for a pressed selection button 110. Once a first selection button occurs, in another step 656, the CPU 108 determines if the first pressed selection button 110 is a press of the spacebar 264. If not, in a next step 658, the CPU 108 assigns to the $n^{th}$ element of the variable BPV sequence 380 the assigned value 222 of the first pressed selection button 110.

In a next step 682, the CPU determines if the pressed selection button 110 is one of the time-dependent buttons 127 or time-independent buttons 129. If the selection button is one of the time-independent buttons 129, then in a subsequent step 684 the CPU 108 assigns to the $m^{th}$ element of the variable BPT sequence 382 the value 'fixed' 355. If the selection button is one of the time-dependent buttons 127, then in another step 618, the CPU 108 starts the elapsed time counter 140. In a pair of steps 620, 622, the CPU 108 monitors the selection buttons 110 for the occurrence of a second selection button press while comparing the elapsed time counter 140 with a user chosen selectable-length time period.

If the elapsed time counter 140 exceeds the duration of the elapsed time period (i.e., expires) before an additional selection button press occurs, in a subsequent step 640 the CPU 108 determines if the first button press is still pressed.

If the first button press is not still pressed when the elapsed time period expires, then in a subsequent step 660 the CPU 108 assigns to the $m^{th}$ element of the variable BPT sequence 382 the value 'short' 340.

If, however, the first button press is still pressed when the elapsed time period expires, then in an alternate subsequent step 662 the CPU 108 assigns to the $m^{th}$ element of the variable BPT sequence 382 the value 'long' 345.

If, however, a second selection button press occurs before the elapsed time counter 140 expires, in another step 664 the CPU 108 assigns to the $m^{th}$ element of the variable BPT sequence 382 the value 'pair' 350. Then, in a subsequent step 666 the CPU 108 adds 1 to the variable number of button presses n 392. Then, in a subsequent step 668 the CPU 108 assigns to the $n^{th}$ element of the variable BPV sequence 380 the assigned value 222 of the second pressed selection button 110. Then, in the subsequent step 666 the CPU 108 again adds 1 to the variable number of button presses n 392. Then, in a subsequent step 670 the CPU 108 adds 1 to the variable number of loops m 390.

According to one embodiment of the method 608, the CPU 108 re-initializes the elapsed time counter 140 to zero and repeats the method in succession until in the step 656 the CPU 108 finds that the selection button pressed in step 614 is a press of the spacebar 264.

Then, in an alternative step 672 the CPU 108 converts the values of the variable BPV sequence 380 to values of a variable 'total BPV sequence' 386 by: (1) doubling values of the BPV sequence 380 that coincide with 'long BPT' values 345 of the BPT sequence 382, and (2) adding together values of the BPV sequence 380 that coincide with consecutive 'pair BPT' values 350 of the BPT sequence 382.

In the case of pairs occurring consecutively in the BPT sequence 382 (i.e., pairs of pairs), no value of the BPV sequence 380 is added to more than one other value. Furthermore, additions are made so that every value of the BPV sequence 380 that coincides with a pair BPT 350 gets added to a consecutive value of the BPV sequence that also coincides with a pair BPT and in such a way that no BPV that coincides with a pair BPT goes un-added.

Then, in a subsequent step 674 the CPU 108 constructs a character sequence 388 by identifying in order from the menu 240 each character 200 whose position 242 equals a value of the total BPV sequence 386.

For a time-dependent button 127, the CPU 108 performs mathematical operations on the button's assigned value 222, depending on if additional button presses occur within an elapsed time period 330 initiated by the button press. One example is to double the button's assigned value 222 if the button remains pressed for the duration of the elapsed time period 330. Another example is to add the value 222 to the value of another selection button pressed before the elapsed time period 330 expires.

For a time-independent button 129, actuation of the button typically does not trigger the CPU to start the elapsed time counter 140. Furthermore, mathematical operations on the assigned value 222 of the time-independent button 129 are typically not performed.

Although the method 608 of FIGS. 4A and 4B are embodiments of a method for a processor 108 to interpret sequences of button presses, the scope of the method is not limited by this embodiment, but rather by the scope of the claims.

Figure 5:
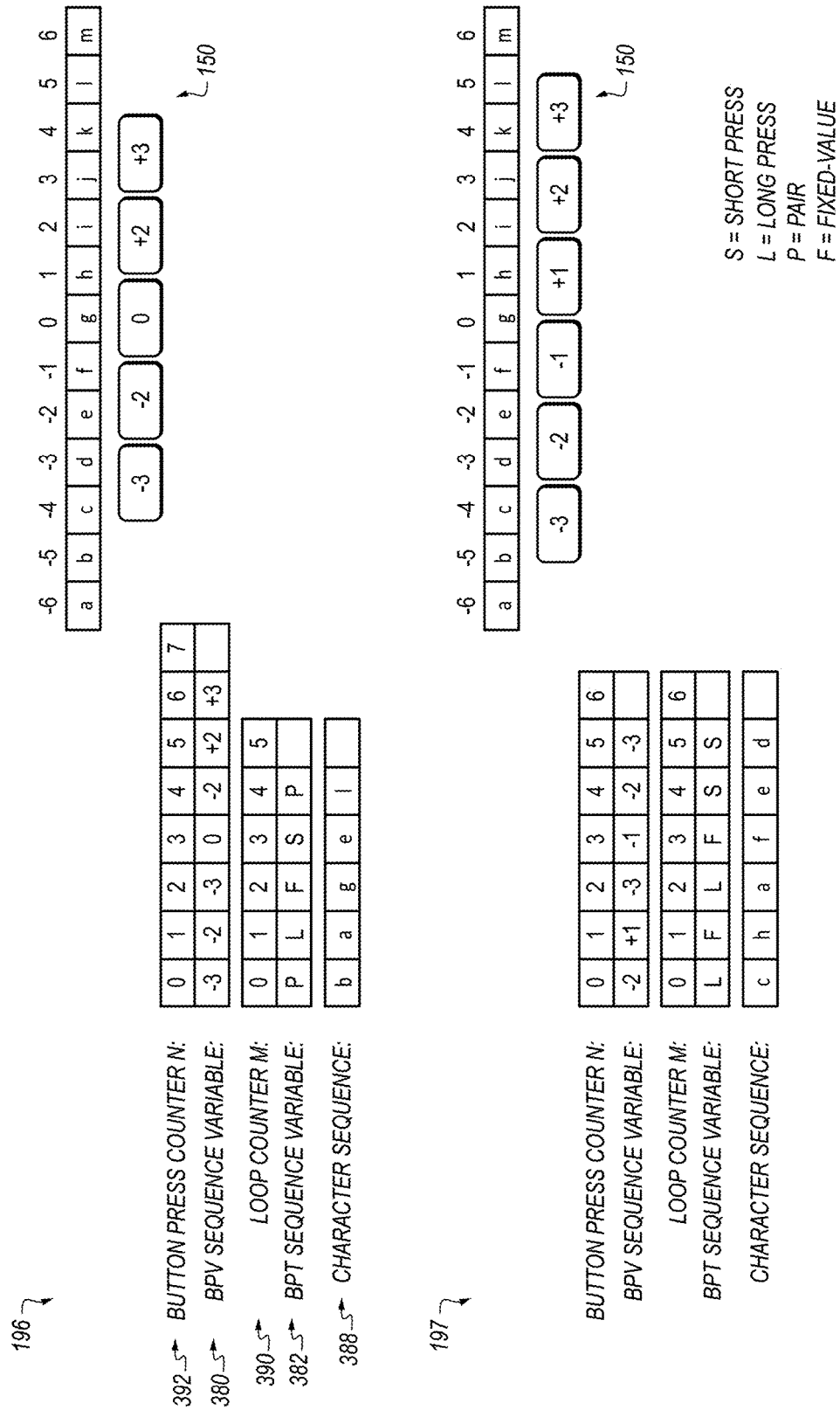
FIG. 5 is an example of an application of a method of word identification.

FIG. 5 shows two examples of the method 608 of FIGS. 4A and 4B for the respective user interfaces 150 of FIG. 5. Each example includes the variables 'number of button presses n' 392, 'BPV sequence' 380, 'number of loops m' 390, 'BPT sequence' 382 and 'character sequence' 388.

In a first example 196, the variable number of button presses n 392 identifies the elements (0-7) of the array variable BPV sequence 380. The BPV sequence 380 contains the BPV 222 of each consecutive button press (−3 −2 −3 0 −2 +2 +3) collected in steps 658 and/or 668 over multiple iterations of the method 608 of FIGS. 4A and 4B. The variable number of loops m 390 identifies the elements (0-5) of the array variable BPT sequence 382. The BPT sequence 382 contains the BPT 224 collected in one of steps 660, 662, or 664 with each iteration of the method 608 of FIGS. 4A and 4B (pair-long-fixed-short-pair). The character sequence 388 contains the selected characters (b a g e l). In the first example 196, values for each of the variables above contribute to select characters of the word 130 'bagel'.

In a second example 197, the variable number of button presses n 392 identifies the elements (0-6) of the array variable BPV sequence 380. The BPV sequence 380 contains the BPV 222 of each consecutive button press (−2 +1 −3 −1 −2 −3) collected in steps 658 and/or 668 over multiple iterations of the method 608 of FIGS. 4A and 4B. The variable number of loops m 390 identifies the elements (0-6) of the array variable BPT sequence 382. The BPT sequence 382 contains the BPT 224 collected in one of steps 660, 662, or 664 with each iteration of the method 608 of FIGS. 4A and 4B (long-fixed-long-fixed-short-short). The character sequence 388 contains the selected characters (c h a f e d). In the second example 197, values for each of the variables above contribute to select characters of the word 130 'chafed'.

FIGS. 6-9 show an example of how the fixed-value BPT 355 is useful in word identification. For the example of FIGS. 6-9, the presumed word 134 is 'bagel'.

Figure 6:
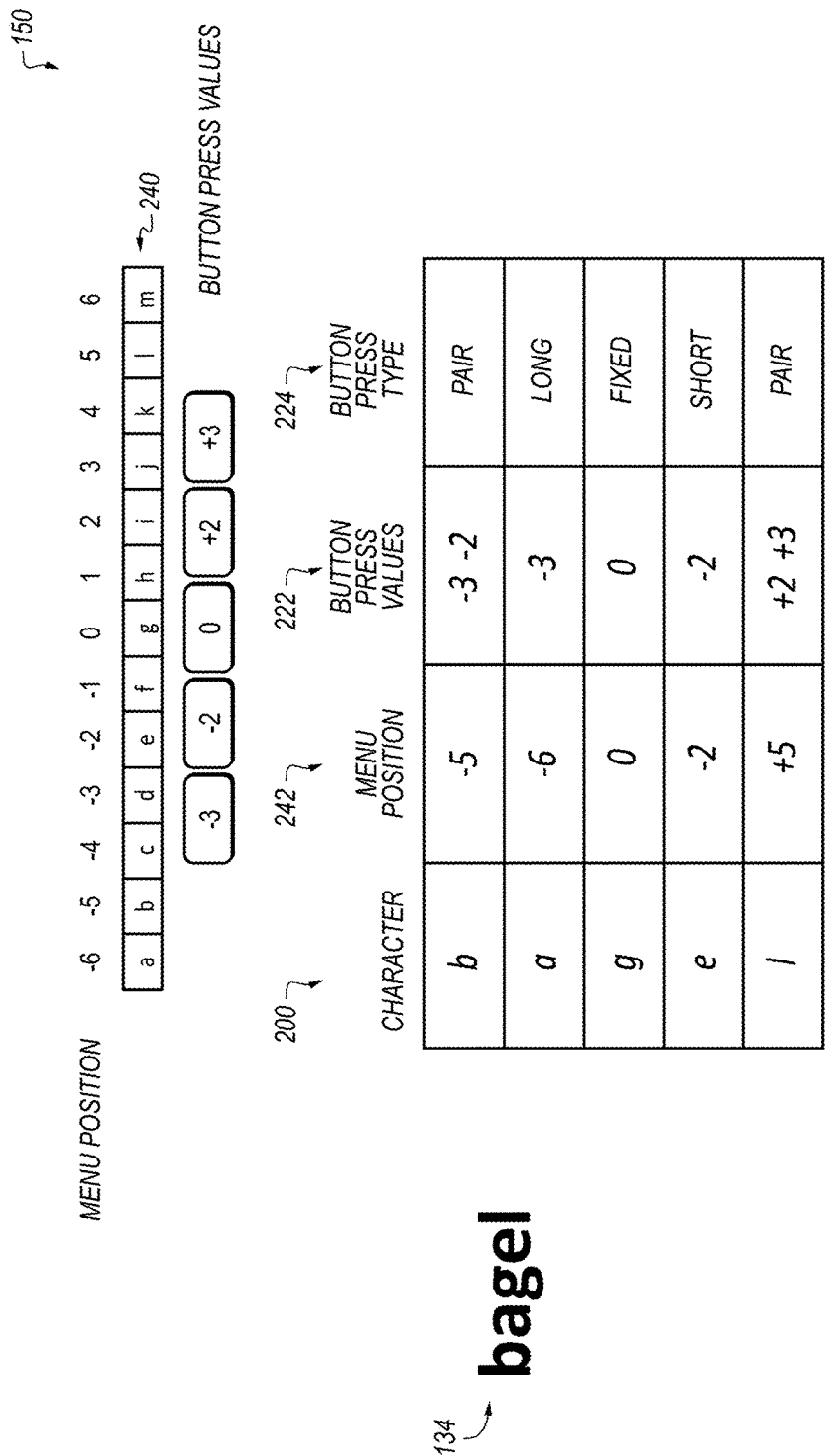

FIG. 6 shows the user interface 150 of FIG. 2, a table of values for each of the variables 'character' 200, 'menu position' 242, 'button press values' 222 and 'button press type' 224, and two sequence variables 'sequence of BPVs' 380, and 'sequence of BPTs' 382.

Values for the variable 'character' 200 derive directly from the presumed word 134. Values for the 'menu position' 242 derive from the position of each character 200 in the menu 240 according to the user interface 150. The value for the variable 'sequence of BPVs' 380 derives from iterative cycles through steps 658 and/or 668 of the method 608 of FIGS. 4A and 4B. The value for the variable 'sequence of BPTs' 382 derives from iterative cycles through steps 660, 662, 664 and/or 684 of the method 608. For the word 134 'bagel', the value for the sequence of BPVs 380 is '−3 −2 −3 0 −2 +2 +3' and the value for the sequence of BPTs 382 is 'pair-long-fixed-short-pair'.

Figure 7:
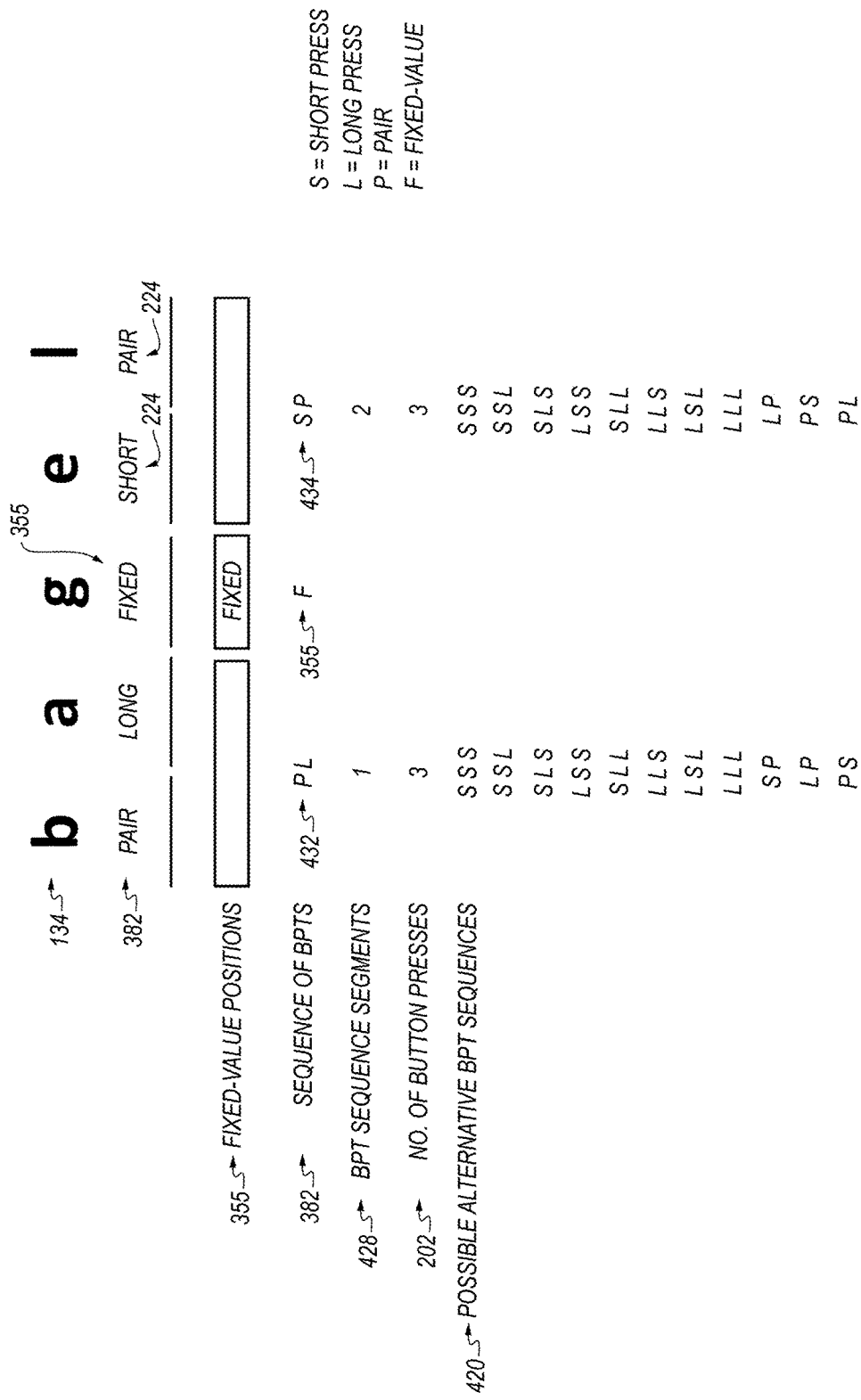
Figure 9:
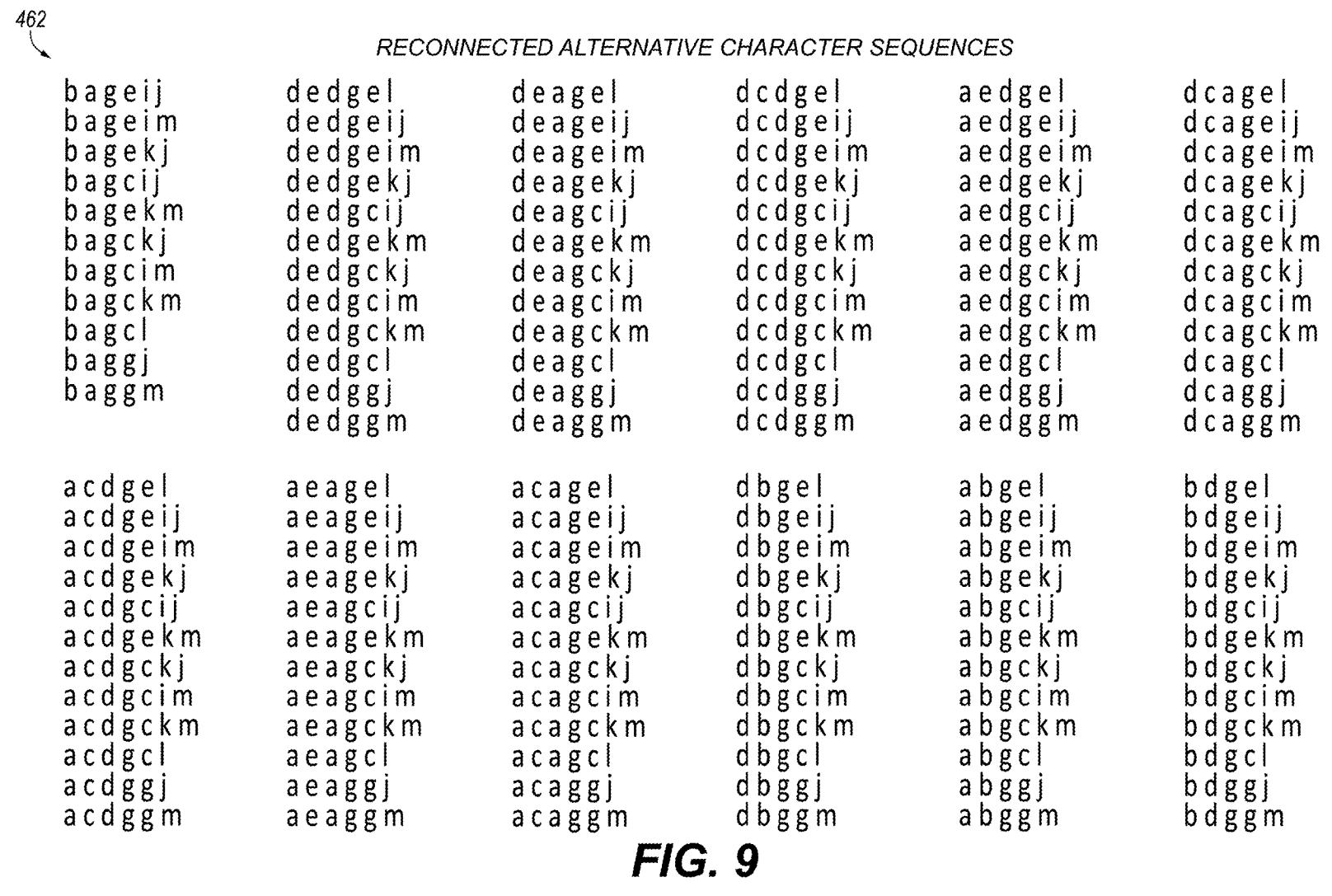

FIGS. 7-9 show how the presumed word 134 and a plurality of reconnected alternative character sequences 462 are derived from the sequence of BPVs 380 and the sequence of BPTs 382 of FIG. 6.

The BPT sequence 382 is divided so that consecutive BPTs 224 not separated by a fixed-value BPT 355 are in the same BPT sequence segment 428. In other words, BPTs 224 separated by fixed-value BPTs 355 are in separate sequence segments 428. For the example of FIG. 7, the BPT sequence 382 has one fixed-value BPT 355 so the sequence 382 is divided into two BPT sequence segments 428: a first segment 432 that has the BPT sequence 'pair-long' and a second segment 434 that has the BPT sequence 'short-pair'.

The number of button presses 202 in the BPT sequence segment 428 determines the possible alternative BPT sequences 420 for the segment, just as the number of presses determines the possible alternative sequences 420 for an entire BPT sequence 382. The alternative BPT sequences 420 are determined as shown in FIGS. 15-18 of U.S. Application No. 62/155,372 (Method of Word Identification that uses Button Press Type Error Analysis, herein incorporated by reference in its entirety). For the example of FIGS. 7-9, both the first and second BPT sequence segments 432, 434 have three button presses and therefore eleven possible alternative BPT sequences 420.

Figure 19:
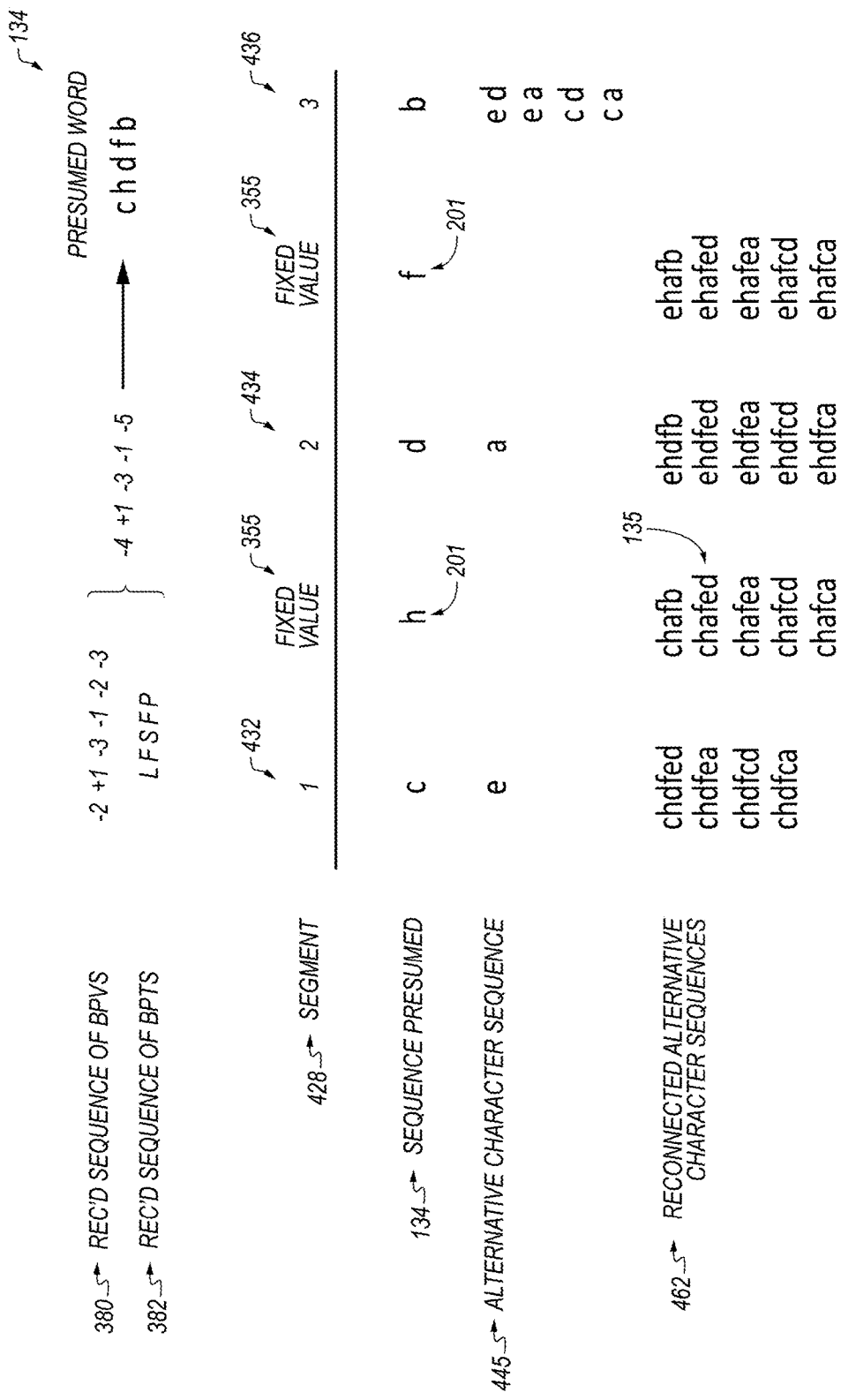

Each possible alternative BPT sequence 420 in each BPT sequence segment 428 is converted to a total BPV sequence 386 (not shown) based on the BPV sequence 380 and then to an alternative character sequence 445 according to the menu position 242 of the user interface 150 of FIG. 2, as previously disclosed in steps of the method 700 of FIG. 19 of U.S. Application No. 62/155,372 (Method of Word Identification that uses Button Press Type Error Analysis). For the example of FIGS. 7-9, the alternative character sequences 445 are shown in FIG. 8.

Each fixed-value BPT 355 is converted to a fixed-value character 201 according to the assigned value 222 of the pressed time-independent selection button 129 and the menu 240 of the user interface 150 of FIG. 2. For the example of FIGS. 7-9 the fixed-value character 201 is 'g'.

One character sequence 445 or presumed sequence 134 from each BPT sequence segment 428 is connected with each fixed-value character 201 in the same order as the BPT sequence segments 428 from which the character sequences, presumed sequences and fixed-value characters are derived and, in that way, builds one of the reconnected alternative character sequences 462. In one embodiment, the CPU 108 identifies a plurality of unique reconnected alternative character sequences 462 by connecting, in different combinations, a character sequence 445 or presumed sequence 134 from each segment 428 with the fixed-value characters 201. In one embodiment, all possible combinations of reconnected alternative character sequences 462 are identified, as shown in FIG. 9. In a further embodiment, all possible combinations of reconnected alternative character sequences 462 are compared with a library 136 of word possibilities. In a further embodiment, if a reconnected alternative character sequence 462 is found in the library 136 and the presumed word 134 is not found in the library, then the CPU 108 accepts as input the found reconnected alternative character sequence 462 in place of the presumed word 134. For the example of FIGS. 7-9, examples of reconnected alternative character sequences 462 are 'b a g e i j', 'b a g e i m', and 'b a g e k j'.

Figure 10:
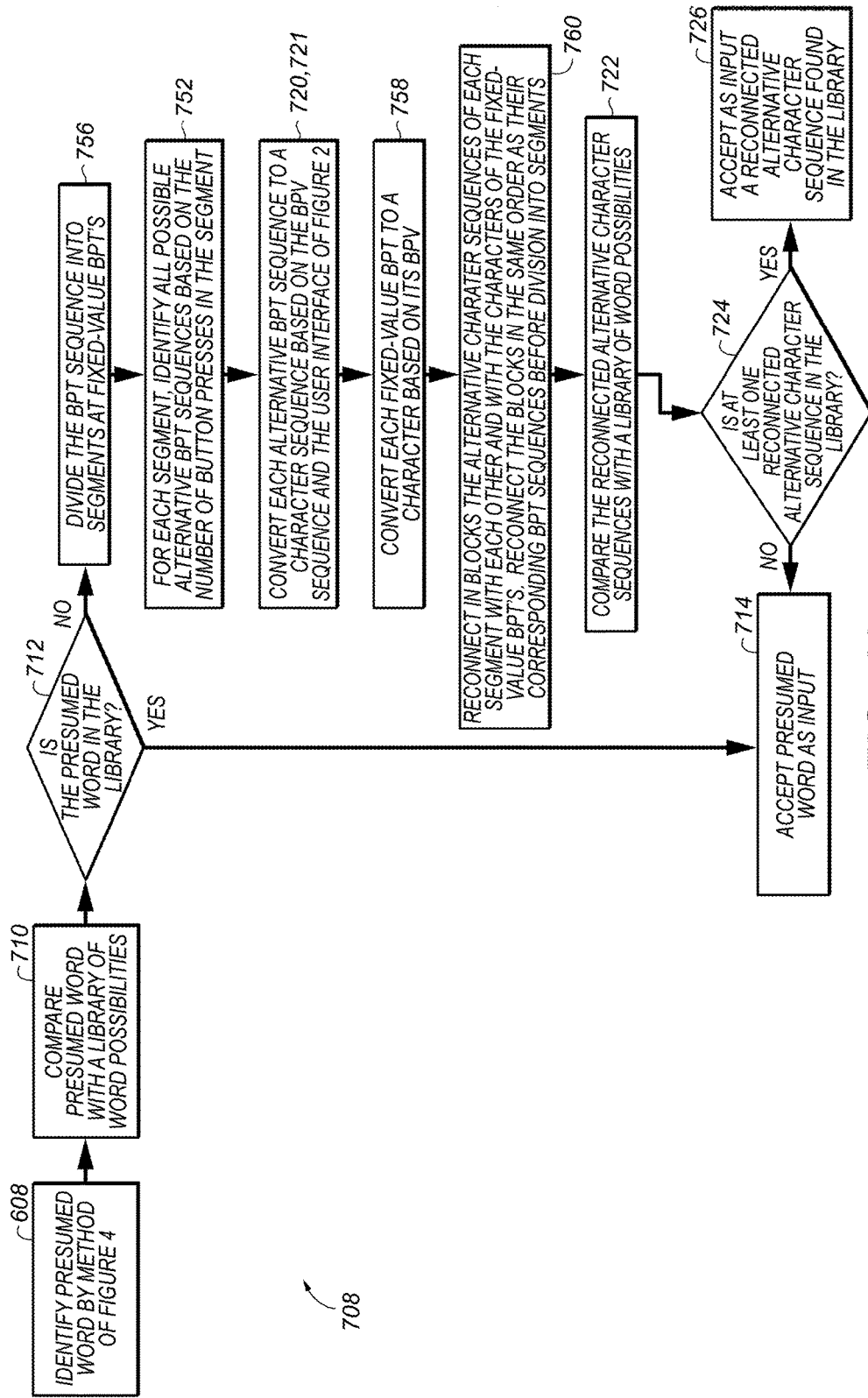
FIG. 10 is a flow diagram of another method for an electronic device to interpret button presses according to one illustrated embodiment.

FIG. 10 shows a method 708 that uses button press types 224 and fixed-value BPTs 355 to identify a word from a received sequence of button presses.

The first step of the method 708 of FIG. 10 is the method 608 of FIGS. 4A and 4B. In the method 608 of FIGS. 4A and 4B, the CPU 108 interprets received button presses and from the presses constructs a character sequence 388. When used within the method 708 of FIG. 10, the constructed character sequence 388 is the presumed word 134.

In a next step 710 of the method 708, the CPU 108 compares the presumed word 134 with a library 136 of word possibilities. In a next step 712, the CPU 108 determines whether the presumed word 134 is found in the library 136 or not.

If the presumed word 134 is in the library 136, then in a next step 714 the CPU 108 accepts the presumed word as input.

If, however, the presumed word 134 is not in the library 136, then in a next step 756 the CPU 108 divides the BPT sequence 382 into the BPT sequence segments 428 by the position of the fixed-value BPTs 355. BPTs 224 not separated by a fixed-value BPT 355 are in the same BPT sequence segment 428. BPTs 224 separated by fixed-value BPTs 355 are in separate sequence segments 428.

In a next step 752, the CPU 108 identifies the possible alternative BPT sequences 420 for each sequence segment 428. The possible alternative BPT sequences 420 for each segment are combinations of BPTs with the same number of button presses as the corresponding segment of the received BPT sequence, as previously disclosed in FIGS. 15-18 of U.S. Application No. 62/155,372 (Method of Word Identification that uses Button Press Type Error Analysis) except applied to an entire word.

In a next step 720 and 721, the CPU 108 converts each alternative BPT sequence 420 to an alternative character sequence 445 based on the BPV sequence 380, and the characters 200 and menu positions 242 of the user interface 150 of FIG. 2, as previously disclosed in FIGS. 21-26 of U.S. Application No. 62/155,372 (Method of Word Identification that uses Button Press Type Error Analysis) except applied to an entire word.

In a next step 758, the CPU 108 converts each fixed-value BPT 355 of the BPT sequence 382 to a fixed-value character 201 according to the assigned value 222 of the selection button 129 of the fixed-value BPT 355 and the menu 240 of the user interface 150 of FIG. 2.

In a next step 760, the CPU 108 connects one character sequence 445 or presumed sequence 134 from each BPT sequence segment 428 with each fixed-value character 201 in the same order as the BPT sequence segments 428 from which the character sequences, presumed sequences, and fixed-value characters are derived and, in that way, builds one of the reconnected alternative character sequences 462. In one embodiment, the CPU 108 identifies a plurality of unique reconnected alternative character sequences 462 by connecting, in different combinations, character sequences 445 and/or presumed sequences 134 from each segment 428 with the fixed-value characters 201. In one embodiment, all possible combinations of reconnected alternative character sequences 462 are identified.

In a next step 722, the CPU 108 compares each reconnected alternative character sequence 462 with the library 136 of word possibilities. Next, in a step 724 the CPU 108 determines whether any reconnected alternative character sequence 462 is found in the library 136.

If at least one reconnected alternative character sequence 462 is in the library 136, then in a step 726 the CPU 108 accepts one of the found alternative sequences 462 as input. If no alternative sequence 462 is in the library 136, then in the step 714 the CPU 108 accepts the presumed word 134 as input.

FIG. 11 shows first and second flowcharts 157, 158. The first flowchart 157 shows variables of the method 608 of FIGS. 4A and 4B and the method 708 of FIG. 10. The second flowchart 158 shows example values for the variables of the first flowchart 157.

The first flowchart 157 incorporates within it the flowchart 138 of FIG. 5 of U.S. Application No. 62/155,372

(Method of Word Identification that uses Button Press Type Error Analysis), which shows the progression of variables through the method 608 of FIGS. 4A and 4B that leads to the presumed word 134. The first flowchart 157 also shows the progression of variables through the method 708 of FIG. 10 that leads to the possible reconnected alternative character sequences 462.

Of note in the first flowchart 157 is the variable 'fixed-value BPT' 355. Acquisition of fixed-value BPTs 355 in step 684 of the method 608 of FIGS. 4A and 4B enables BPT sequence segmentation in step 756 of the method 708 of FIG. 10. Sequence segmentation is beneficial because it reduces the number of alternative BPT sequences 420 possible for a given BPT sequence 382.

Furthermore, acquisition of the fixed-value BPTs 355 requires no extra effort on the part of the user. As described in FIG. 2, fixed-value selection buttons 129 are interspersed among the selection buttons 110 and to the user appear as just another button. No decision or additional actuation recognizable to the user is required for the CPU 108 to receive the additional BPT 224. Acquisition of the fixed-value BPT 355 along with the other three BPTs 340, 345, 350 is transparent to the user.

The first flowchart 157 of FIG. 11 has four input variables: (1) 'sequence of button press values' 380, (2) 'co-press' 210, (3) 'duration' 208, and (4) 'fixed-value BPT' 355. Along one path of the flowchart 157, the variables 'co-press' 210, 'duration' 208 and 'fixed-value' 355 together determine the variable 'sequence of button press types' 382, which occurs as a result of repeated loops through steps 620, 640 and 682 of FIGS. 4A and 4B. Next, the variables 'sequence of button press values' 380 and 'sequence of button press types' 382 together determine the variable 'sequence of total button press values' 386, which occurs in step 672 of the method 608 of FIGS. 4A and 4B. Finally, the variable 'sequence of total button press values' 386 determines the variable 'presumed word' 134 which occurs in step 674 of the method 608 and is based on the user interface 150 of FIG. 2.

Along another path of the flowchart 157, the variable 'sequence of BPTs' 382 determines the variable 'BPT sequence segments' 428, which occurs in the step 756 of the method 708 of FIG. 10. Next in the flowchart, the variable 'BPT sequence segments' 428 determines the variable 'number of button presses per sequence segment' 202, which occurs within step 752 of the method 708. Next in the flowchart, the variable 'number of button presses per sequence segment' 202 determines the variable 'possible alternative BPT sequences per segment' 420, which also occurs in step 752. Next, the variables 'sequence of button press values' 380 and 'possible alternative BPT sequences per segment' 420 together determine the variable 'possible alternative sequences of total BPVs per segment' 426, which occurs within step 720. Next, the variable 'possible alternative sequences of total BPVs per segment' 426 determines the variable 'possible alternative character sequences per segment' 445, which also occurs within step 720. Next, the variable 'possible alternative character sequences per segment' 445 determines the variable 'reconnected alternative character sequences' 462, which occurs in step 760 of the method 708. Finally, the variables 'reconnected alternative character sequences' 462 and 'presumed word' 134 are compared with the variable 'library of words' 136 to determine the variable 'identified word' 130, which occurs in steps 710 and 724.

The second flowchart 158 shows example values for each variable of the first flowchart 157 for the embodiment of the user interface 150 of FIG. 2.

The variable 'sequence of button press values' 380 has the value '−3 −2 −3 0 −2 +2 +3' 381. The variable 'fixed-value BPT' 355 has the values 'fixed' or 'not' 356. The variable 'co-press' 210 has the values 'pair' or 'not' 211. The variable 'duration' 208 has the values '<ETP' or '> ETP' 209. The variable 'sequence of button press types' 382 has the value 'pair-long-fixed-short-pair' 383. The variable 'sequence of total button press values' 386 has the value '−5 −6 0 −2 +5' 387. The variable 'presumed word' 134 has the value 'b a g e l' 135. The variable 'button press type sequence segments' 428 has the values 'pair-long', 'fixed' and 'short-pair' 429. The variable 'number of button presses per sequence segment' 202 has the values '3', '1' and '3' 203. The variable 'possible alternative BPT sequences per segment' 420 has as values an array of BPTs 'S S S, S S L, S L S . . . P S, and 'S S S, S S L, S L S . . . P S' 421. The variable 'possible alternative sequences of total BPVs per segment' 426 has as values an array of value sequences '−3 −2 −3, −3 −2 −6, −3 −4 −3 . . . −5 −3, 0, . . . ' 427. The variable 'possible alternative character sequences per segment' 445 has as values an array of character sequences 'd e d, d e a, d c d b d; g; . . . ' 446. The variable 'reconnected alternative character sequences' 462 has as values an array 'dedgeij, dedgeim, dedgekj . . . bdggm' 463. The variable 'identified word' 130 has the value 'b a g e l' 131.

The values of the second flowchart 158 are examples used to demonstrate the embodiments of FIGS. 2, 4 and 10. The scope of the invention is not limited by the variables and particular values shown here, but rather by the scope of the claims.

Figure 12:
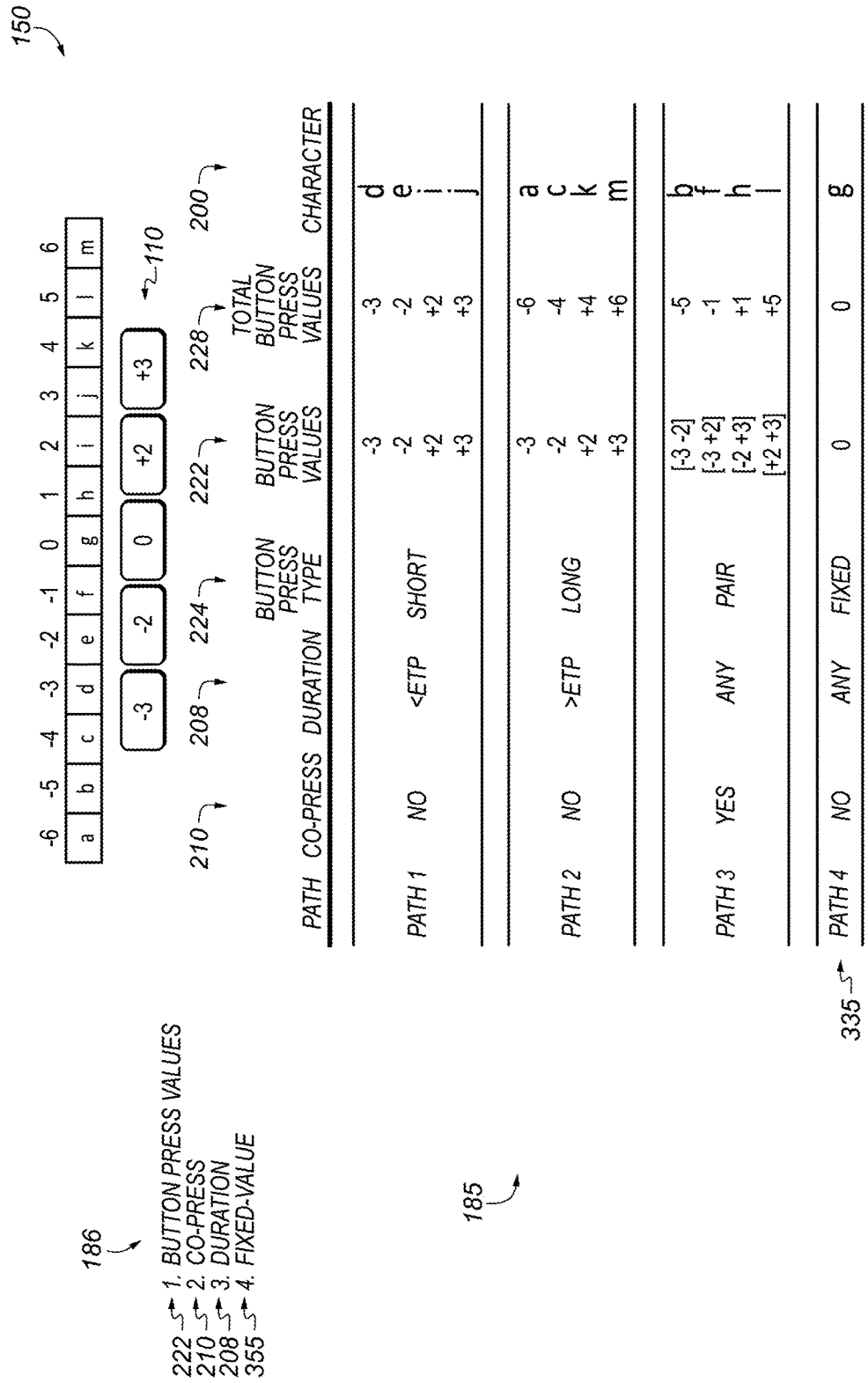
FIG. 12 is a table of value assignments, a user interface and a list of variables for one embodiment of a method of character identification.

FIG. 12 shows the user interface 150 of FIG. 2, a table 185 of value assignments for variables of the method 708 of FIG. 10, and a list of input variables 186 for the method 608 of FIGS. 4A and 4B. The user interface 150, table 185, and list of variables 186 are examples used to demonstrate the embodiments of FIGS. 2, 4 and 10. The scope of the invention is not limited by the variables and values shown here, but rather by the scope of the claims.

The table 185 is divided into rows and columns. Rows are grouped by path. Each path corresponds to a possible route through the method 608 of FIGS. 4A and 4B. The path taken determines the button press type 224 assigned to the button presses of a given iteration, which become identified in one of steps 660, 662, 664 or 684.

Each column of the table 185 is one variable: the variable 'co-press' 210, the variable 'duration' 208, the variable 'button press type' 224, the variable 'button press values' 222, the variable 'total button press value' 228 and the variable 'character' 200.

Each line of the table 185 is a unique combination of the variables button press type 224 and button press value 222. For the embodiment of the user interface 150 of FIG. 2, five selection buttons 110 enable 13 unique variable combinations.

The list 186 highlights which of the variables of the method 708 of FIG. 10 are the input variables. The input variables are: (1) 'button press values' 222, (2) 'co-press' 210, (3) 'duration' 208 and (4) 'fixed-value BPT' 355. The remaining variables of the table 185 (button press type' 224, 'total button press value' 228, and 'character' 200) all follow from the input variables 186 and the user interface 150, as shown by the flowcharts of FIG. 11.

FIG. 13 shows a table that compares characteristics of two different input methods. One method shown is the method 708 of FIG. 10, also known as the reduced-button input method. Another method shown is a 26-button input method 132. A standard QWERTY keyboard is one example of the 26-button method 132.

The characteristics compared in the table of FIG. 7 are: input variables, possible values for the input variables, level of control, and factor determining the level of control.

The reduced-button method 708 has four input variables: (1) button press value 222, (2) co-press 210, (3) duration 208 and (4) fixed-value BPT 355. These four variables appear as inputs in the first flowchart 157 of FIG. 11 and in steps 620, 640, 658, 668 and 682 of the method 608 of FIGS. 4A and 4B. Possible values of these variables for the user interface 150 of FIG. 2 are: (1) −3, −2, 0, +2 or +3, (2) pair or not, (3)<ETP or > ETP, and (4) fixed or not.

The 26-button method 132 has one input variable: button press value 222. Possible values for the button press value 222 in the case of the 26-button method are the characters themselves: a, b, c, d . . . and so on.

Level of control over the four variables for the reduced-button method 708 is high for the button press value variable 222 and fixed-value BPT variable 355, but low for the co-press 210 and duration 208. The factor that determines the high level of control over the button press value variable 222 and the fixed-value BPT variable 355 is the button size. Because the reduced button method 708 requires fewer buttons compared to the number of characters that are selectable, relative to other input methods there is space available to increase the button size. For example, for the 13:5 ratio between characters to buttons shown in the interface 150 of FIG. 2, only ten buttons are required to offer every character of the English alphabet. Therefore even in a compact application like a mobile device, button size can be large enough for a human finger to press them without error, so the level of control is considered high.

The factors determining the low level of control for the variables co-press 210 and duration 208 are the moment of button press and the moment of button release. Both these variables 208, 210 are time dependent and in a typical application need to be controlled to a precision of less than tenths of a second. Achieving that level of control is difficult on a routine basis, so for that reason the level of control over these variables is considered low. However, due to the predictability of button press timing errors, the low level of control over the variables co-press 210 and duration 208 can be overcome with BPT error analysis.

For the 26-button method 132, level of control over the button press value variable 222 is low. As with the reduced button method 708, the factor determining the level of control for the button press value 222 is button size. But the difference with the 26-button method 132 is that due to the requirement to provide 26 buttons, the size of each individual button must be small in a compact application. In use, the small button size leads to button press errors, which makes the level of control over the button press value variable 222 considered low for the 26-button method 132.

Figure 14:
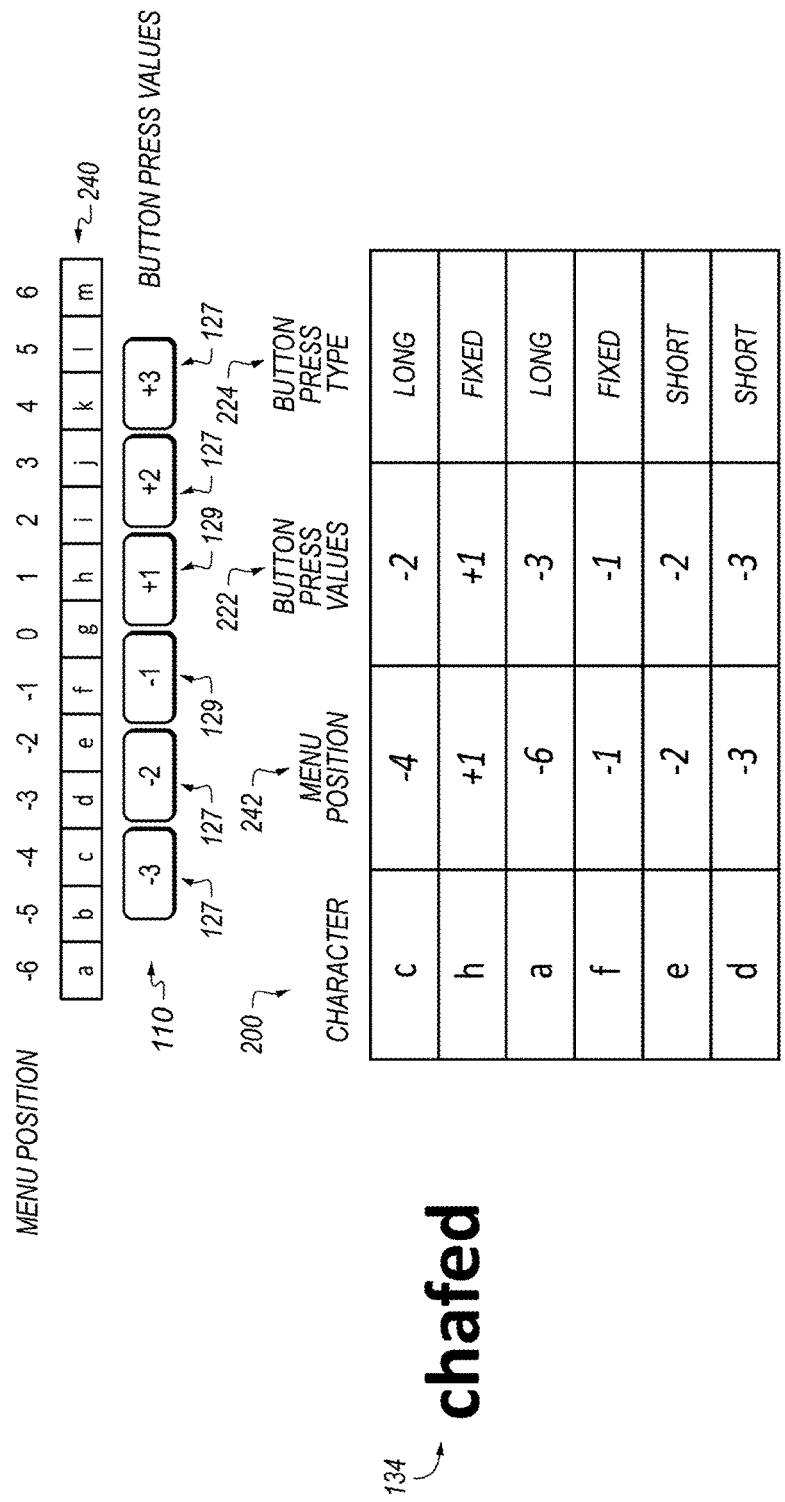
FIGS. 14-16 are examples of an application of a method of word identification.
Figure 15:
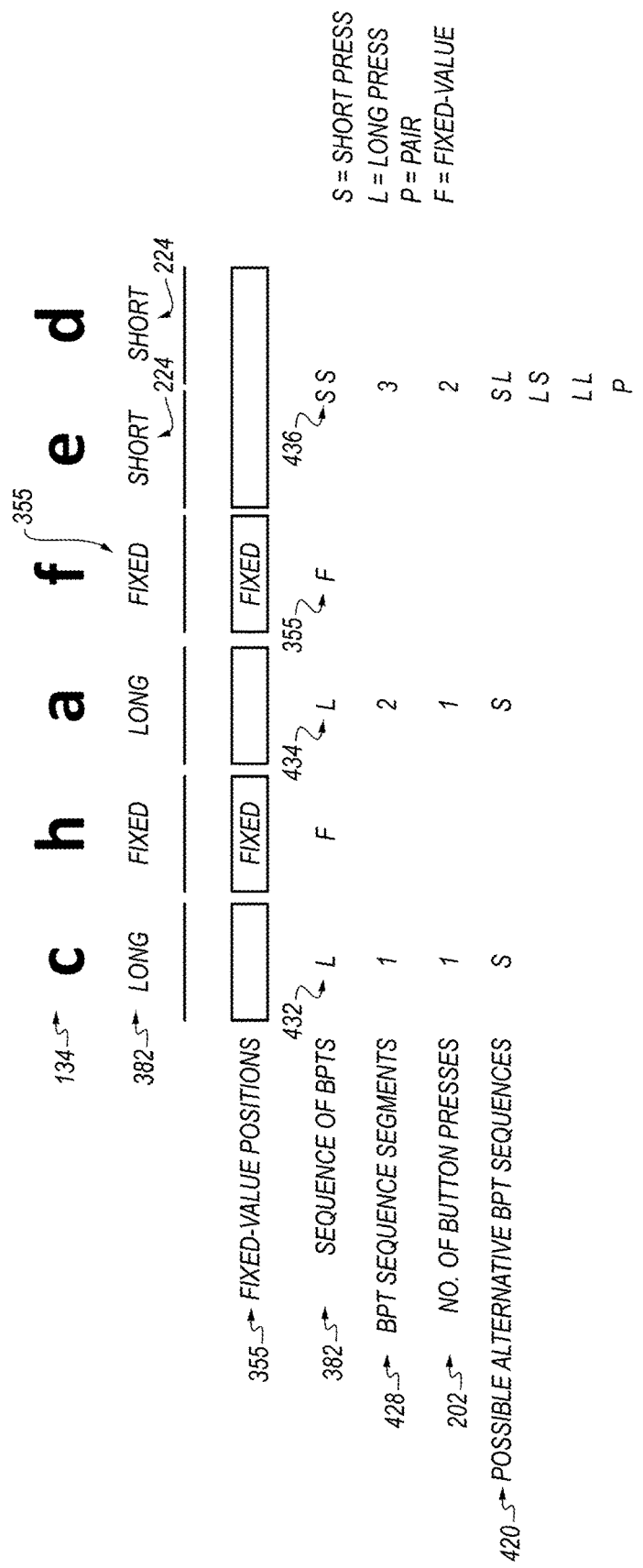
Figure 16:
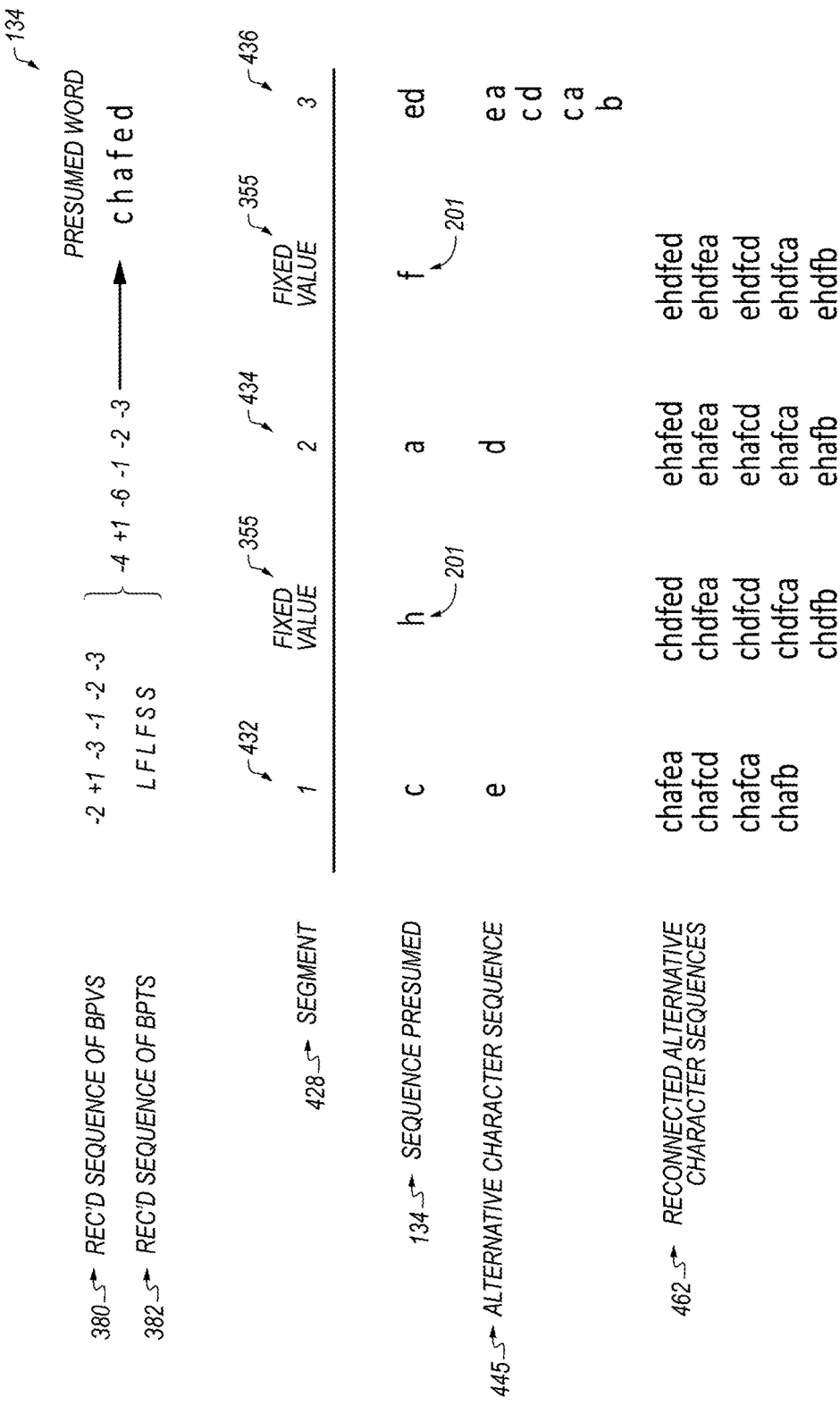

FIGS. 14-16 show an example of how the fixed-value BPT 355 is useful in word identification. For the example of FIGS. 14-16, the presumed word 134 is 'chafed'.

FIG. 14 shows an alternative embodiment of the user interface 150 of FIG. 2, a table of values for each of the variables 'character' 200, 'menu position' 242, 'button press values' 222 and 'button press type' 224, and two sequence variables 'sequence of BPVs' 380, and 'sequence of BPTs' 382. The embodiment of the user interface 150 of FIG. 14 has four time-dependent selections buttons 127 that have the assigned button press values 222 '−3, −2, +2, and +3'. The embodiment has two time-independent selections buttons 129 that have the assigned button press values 222 '−1' and '+1'.

Values for the variable 'character' 200 derive directly from the presumed word 134. Values for the 'menu position' 242 derive from the position of each character 200 in the menu 240 according to the user interface 150. The value for the variable 'sequence of BPVs' 380 derives from iterative cycles through steps 658 and/or 668 of the method 608 of FIGS. 4A and 4B. The value for the variable 'sequence of BPTs' 382 derives from iterative cycles through steps 660, 662, 664, and/or 668 of the method 608. For the presumed word 134 'chafed', the value for the sequence of BPVs 380 is '−2 +1 −3 −1 −2 −3' and the value for the sequence of BPTs 382 is 'long-fixed-long-fixed-short-short'.

FIGS. 15-16 show how the presumed word 134 and a plurality of reconnected alternative character sequences 462 are derived from the sequence of BPVs 380 and the sequence of BPTs 382 of FIG. 14.

The BPT sequence 382 is divided so that consecutive BPTs 224 not separated by a fixed-value BPT 355 are in the same BPT sequence segment 428. In other words, BPTs 224 of the sequence 382 separated by fixed-value BPTs 355 are in separate sequence segments 428. For the example of FIG. 15, the BPT sequence 382 has two fixed-value BPTs 355 so the sequence 382 is divided into three BPT sequence segments 428: a first segment 432 that has the BPT sequence 'long', a second segment 434 that has the BPT sequence 'long' and a third segment 436 that has the BPT sequence 'short-short'.

The number of button presses 202 in the BPT sequence segment 428 determines the possible alternative BPT sequences 420 for the segment, just as the number of presses determines the possible alternative sequences 420 for an entire BPT sequence 382. The alternative BPT sequences 420 are determined as shown in FIGS. 15-18 of U.S. Application No. 62/155,372 (Method of Word Identification that uses Button Press Type Error Analysis). For the example of FIGS. 14-16, both the first and second BPT sequence segments 432, 434 have one button press and therefore one possible alternative BPT sequence 420. The third BPT sequence segment 436 has two button presses and therefore four possible alternative BPT sequences 420.

Each possible alternative BPT sequence 420 in each BPT sequence segment 428 is converted to a total BPV sequence 386 (not shown) based on the BPV sequence 380 and then to an alternative character sequence 445 according to the menu position 242 of the user interface 150 of FIG. 14, as previously disclosed in steps of the method 700 of FIG. 19 of U.S. Application No. 62/155,372 (Method of Word Identification that uses Button Press Type Error Analysis). For the example of FIGS. 14-16, the alternative character sequences 445 are 'e' for the first segment 432, 'd' for the second segment 434 and e a', 'c d', 'c a', and 'b' for the third segment 436, as shown in FIG. 16.

Each fixed-value BPT 355 is converted to a fixed-value character 201 according to the assigned value 222 of the selection button 129 of the fixed-value BPT and the menu 240 of the embodiment of the user interface 150 of FIG. 14. For the example of FIGS. 14-16 the fixed-value characters 201 are 'h' and 'f'.

One character sequence 445 or presumed sequence 134 from each BPT sequence segment 428 is connected with each fixed-value character 201 in the same order as the BPT sequence segments 428 from which the character sequences, presumed sequences and fixed-value characters are derived and, in that way, builds one of the reconnected alternative character sequences 462. In one embodiment, the CPU 108 identifies a plurality of unique reconnected alternative character sequences 462 by connecting, in different combinations, a character sequence 445 and/or presumed sequence 134 from each segment 428 with the fixed-value characters 201. In one embodiment, all possible combinations of reconnected alternative character sequences 462 are identified, as shown in FIG. 16. In a further embodiment, all possible combinations of reconnected alternative character sequences 462 are compared with a library 136 of word possibilities. In a further embodiment, if a reconnected alternative character sequence 462 is found in the library 136 and the presumed word 134 is not found in the library, then the CPU 108 accepts as input the found reconnected alternative character sequence 462 in place of the presumed word 134. For the example of FIGS. 14-16, the reconnected alternative character sequences 462 are 'c h a f e a', 'c h a f c d', 'c h a f c a', 'c h a f b', 'c h d f e d' and so on. None of the reconnected alternative character sequences 462 are known words except for the presumed sequence 134, therefore the presumed sequence is accepted as input. If a button press timing error existed in the received sequence of BPTs 382, the word 'chafed' would have appeared among the reconnected alternative character sequences 462.

Figure 17:
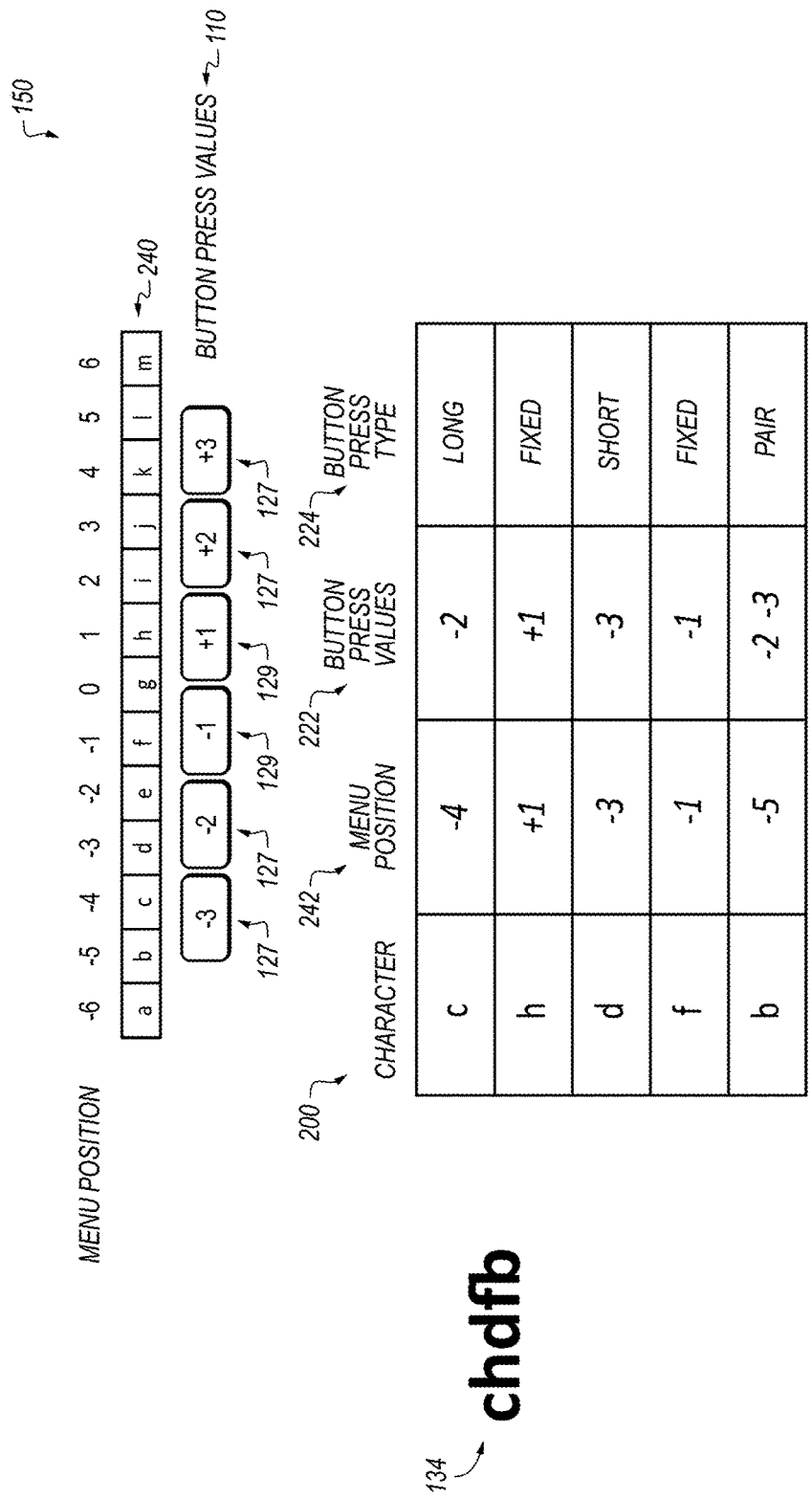
FIGS. 17-19 are additional examples of an application of a method of word identification.
Figure 18:
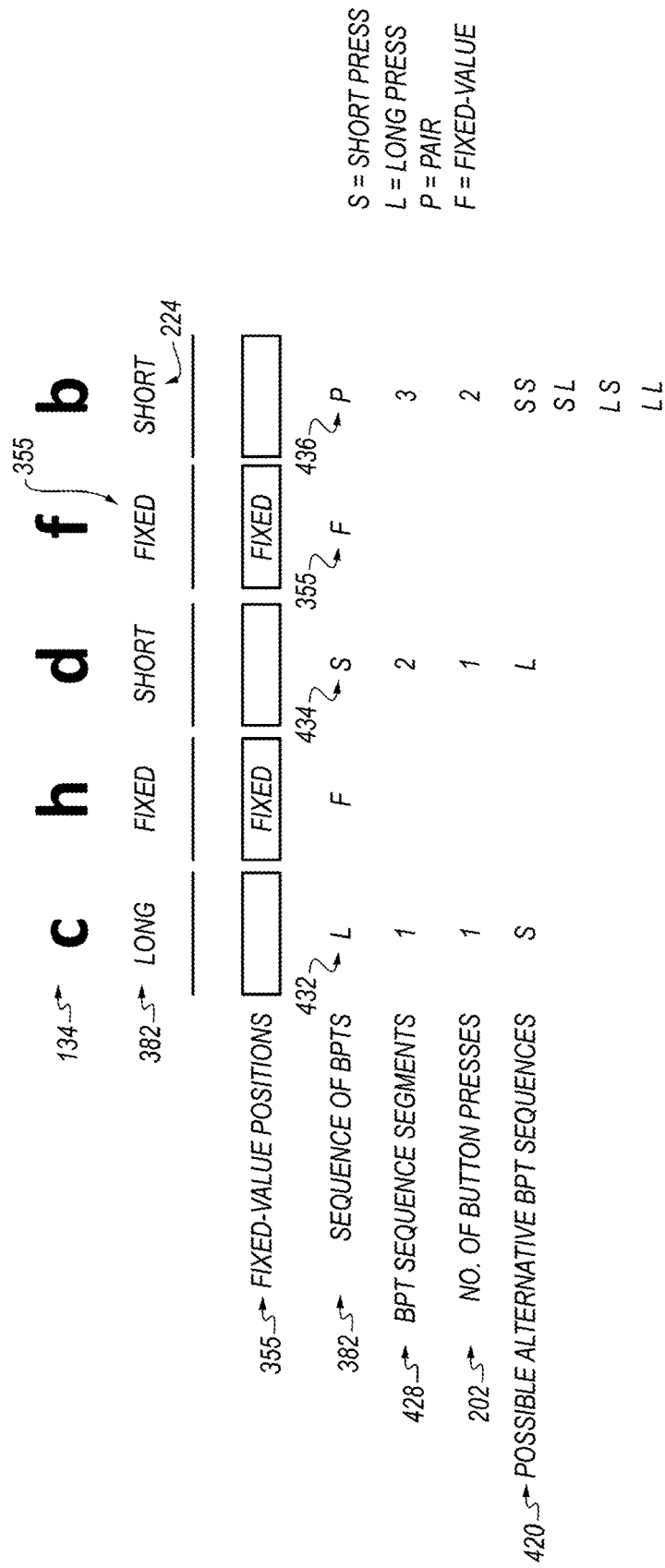

FIGS. 17-19 show another example of how the fixed-value BPT 355 is useful in word identification. For the example of FIGS. 17-19, the presumed word 134 is chdfb'. The intended word and BPV sequence 380 are the same as the example of FIGS. 14-16, however the BPT sequence 382 is different due to inaccurately timed button presses.

FIG. 17 shows an alternative embodiment of the user interface 150 of FIG. 2, a table of values for each of the variables 'character' 200, 'menu position' 242, 'button press values' 222 and 'button press type' 224, and two sequence variables 'sequence of BPVs' 380, and 'sequence of BPTs' 382. The embodiment of the user interface 150 of FIG. 14 has four time-dependent selections buttons 127 that have the assigned button press values 222 '–3, –2, +2, and +3'. The embodiment has two time-independent selections buttons 129 that have the assigned button press values 222 '–1' and '+1'.

Values for the variable 'character' 200 derive directly from the presumed word 134. Values for the 'menu position' 242 derive from the position of each character 200 in the menu 240 according to the user interface 150. The value for the variable 'sequence of BPVs' 380 derives from iterative cycles through steps 658 and/or 668 of the method 608 of FIGS. 4A and 4B. The value for the variable 'sequence of BPTs' 382 derives from iterative cycles through steps 660, 662, 664, and/or 668 of the method 608. For the presumed word 134 chdfb', the value for the sequence of BPVs 380 is '–2 +1 –3 –1 –2 –3' and the value for the sequence of BPTs 382 is 'long—fixed—short—fixed—short—pair'.

FIGS. 18 and 19 show how the presumed word 134 and a plurality of reconnected alternative character sequences 462 are derived from the sequence of BPVs 380 and the sequence of BPTs 382 of FIG. 17.

The BPT sequence 382 is divided so that consecutive BPTs 224 not separated by a fixed-value BPT 355 are in the same BPT sequence segment 428. In other words, BPTs 224 of the sequence 382 separated by fixed-value BPTs 355 are in separate sequence segments 428. For the example of FIG. 18, the BPT sequence 382 has two fixed-value BTPs 355 so the sequence 382 is divided into three BPT sequence segments 428: a first segment 432 that has the BPT sequence 'long', a second segment 434 that has the BPT sequence 'short' and a third segment 436 that has the BPT sequence 'pair'.

The number of button presses 202 in the BPT sequence segment 428 determines the possible alternative BPT sequences 420 for the segment, just as the number of presses determines the possible alternative sequences 420 for an entire BPT sequence 382. The alternative BPT sequences 420 are determined as shown in FIGS. 15-18 of U.S. Application No. 62/155,372 (Method of Word Identification that uses Button Press Type Error Analysis). For the example of FIGS. 17-19, both the first and second BPT sequence segments 432, 434 have one button press and therefore one possible alternative BPT sequence 420. The third BPT sequence segment 436 has two button presses and therefore four possible alternative BPT sequences 420.

Each possible alternative BPT sequence 420 in each BPT sequence segment 428 is converted to a total BPV sequence 386 (not shown) based on the BPV sequence 380 and then to an alternative character sequence 445 according to the menu position 242 of the user interface 150 of FIG. 17, as previously disclosed in steps of the method 700 of FIG. 19 of U.S. Application No. 62/155,372 (Method of Word Identification that uses Button Press Type Error Analysis). For the example of FIGS. 17-19, the alternative character sequences 445 are e' for the first segment 432, 'a' for the second segment 434 and 'e d', 'e a', c d', and 'c a' for the third segment 436, as shown in FIG. 19.

Each fixed-value BPT 355 is converted to a fixed-value character 201 according to the assigned value 222 of the selection button 129 of the fixed-value BPT and the menu 240 of the embodiment of the user interface 150 of FIG. 17. For the example of FIGS. 17-19 the fixed-value characters 201 are 'h' and 'f'.

One character sequence 445 or presumed sequence 134 from each BPT sequence segment 428 is connected with each fixed-value character 201 in the same order as the BPT sequence segments 428 from which the character sequences, presumed sequences and fixed-value characters are derived and, in that way, builds one of the reconnected alternative character sequences 462. In one embodiment, the CPU 108 identifies a plurality of unique reconnected alternative character sequences 462 by connecting, in different combinations, a character sequence 445 and/or presumed sequence 134 from each segment 428 with the fixed-value characters 201. In one embodiment, all possible combinations of reconnected alternative character sequences 462 are identified, as shown in FIG. 19. In a further embodiment, all possible combinations of reconnected alternative character sequences 462 are compared with a library 136 of word possibilities. In a further embodiment, if a reconnected alternative character sequence 462 is found in the library 136 and the presumed word 134 is not found in the library, then the CPU 108 accepts as input the found reconnected alternative character sequence 462 in place of the presumed word 134. For the example of FIGS. 17-19, the reconnected alternative character sequences 462 are 'c h d f e d', 'c h d f b', 'e h d f b', 'e h a f b', 'c h d f e a', 'c h a f e d' and so on. The presumed word 134 chdfb' is not a known word, but one of the possible reconnected alternative character sequences 462 is a known word: 'chafed'. Therefore a particular reconnected alternative character sequence 135 'c h a f e d' is accepted as input in place of the presumed word 134 chdfb'.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer processor-implemented method comprising:
receiving, by at least one computer processor, input resulting from actuation of a plurality of time-dependent buttons and at least one time-independent button;
interpreting, by at least one computer processor, from the received input, a sequence of button press values and a sequence of button press types;
dividing, by at least one computer processor, the interpreted sequence of button press types into segments at positions in the sequence occupied by a button press type that is interpreted from an actuation of the at least one time-independent button;
determining, by at least one computer processor, for each segment, at least one alternative sequence of button press types associated with the segment, wherein each alternative sequence of button press types associated with the segment has a same number of button actuations as the segment;
converting, by at least one computer processor, for each segment, each associated alternative sequence of button press types to an alternative sequence of characters associated with the segment according to the interpreted sequence of button press values; and
determining, by at least one computer processor, at least one reconnected sequence comprised of, for each segment, an alternative sequence of characters associated with the segment or a presumed sequence of characters associated with the segment, the presumed sequence of characters associated with the segment based on the input resulting from the actuation of the buttons.

2. The method of claim 1 wherein the at least one reconnected sequence is a plurality of alternative reconnected sequences and further comprising:
comparing, by at least one computer processor, the plurality of reconnected sequences with a library of known words; and
selecting, by at least one computer processor, one of the plurality of reconnected sequences as input in place of a presumed word, the presumed word based on the input resulting from the actuations of the buttons.

3. The method of claim 1 wherein the at least one reconnected sequence is comprised of, for each segment, an alternative sequence of characters associated with the segment.

4. A system comprising:
at least one computer processor; and
at least one memory coupled to the at least one computer processor, the at least one memory having computer executable instructions stored thereon that, when executed, cause the at least one processor to perform:
receiving input resulting from actuation of a plurality of time-dependent buttons and at least one time-independent button;
interpreting from the received input, a sequence of button press values and a sequence of button press types;
dividing the interpreted sequence of button press types into segments at positions in the sequence occupied by a button press type that is interpreted from an actuation of the at least one time-independent button;
determining, for each segment, at least one alternative sequence of button press types associated with the segment, wherein each alternative sequence of button press types associated with the segment has a same number of button actuations as the segment;
converting for each segment, each associated alternative sequence of button press types to an alternative sequence of characters associated with the segment according to the interpreted sequence of button press values; and
determining at least one reconnected sequence comprised of, for each segment, an alternative sequence of characters associated with the segment or a presumed sequence of characters associated with the segment, the presumed sequence of characters associated with the segment based on the input resulting from the actuation of the buttons.

5. The system of claim 4 wherein the at least one reconnected sequence is a plurality of alternative reconnected sequences and wherein the computer executable instructions, when executed, further cause the at least one processor to perform:
comparing the plurality of reconnected sequences with a library of known words; and
selecting one of the plurality of reconnected sequences as input in place of a presumed word, the presumed word based on the input resulting from the actuations of the buttons.

6. The system of claim 4 wherein the at least one reconnected sequence is comprised of, for each segment, an alternative sequence of characters associated with the segment.

7. A non-transitory computer-readable medium having computer executable instructions stored thereon that, when executed, cause at least one processor to perform:
receiving input resulting from actuation of a plurality of time-dependent buttons and at least one time-independent button;
interpreting from the received input, a sequence of button press values and a sequence of button press types;
dividing the interpreted sequence of button press types into segments at positions in the sequence occupied by a button press type that is interpreted from an actuation of the at least one time-independent button;
determining, for each segment, at least one alternative sequence of button press types associated with the segment, wherein each alternative sequence of button press types associated with the segment has a same number of button actuations as the segment;
converting for each segment, each associated alternative sequence of button press types to an alternative sequence of characters associated with the segment according to the interpreted sequence of button press values; and
determining at least one reconnected sequence comprised of, for each segment, an alternative sequence of characters associated with the segment or a presumed sequence of characters associated with the segment, the presumed sequence of characters associated with the segment based on the input resulting from the actuation of the buttons.

8. The computer-readable medium of claim 7 wherein the at least one reconnected sequence is a plurality of alternative reconnected sequences and wherein the computer executable instructions, when executed, further cause the at least one processor to perform:

comparing the plurality of reconnected sequences with a library of known words; and selecting one of the plurality of reconnected sequences as input in place of a presumed word, the presumed word based on the input resulting from the actuations of the buttons.

9. The computer-readable medium of claim 7 wherein the at least one reconnected sequence is comprised of, for each segment, an alternative sequence of characters associated with the segment.

* * * * *